(12) United States Patent
Jung et al.

(10) Patent No.: US 8,947,297 B2
(45) Date of Patent: Feb. 3, 2015

(54) POSITIONAL DISPLAY ELEMENTS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

(*) Notice: Subject to any disclaimer, the term of this patent is extended or adjusted under 35 U.S.C. 154(b) by 747 days.

(21) Appl. No.: 12/799,417

(22) Filed: Apr. 23, 2010

(65) Prior Publication Data
US 2010/0245243 A1    Sep. 30, 2010

Related U.S. Application Data

(63) Continuation-in-part of application No. 11/343,800, filed on Jan. 30, 2006, now abandoned.

(51) Int. Cl.
*G01S 7/04* (2006.01)
*G02F 1/167* (2006.01)
*G09G 3/34* (2006.01)
(Continued)

(52) U.S. Cl.
CPC ..................................... *G06T 11/60* (2013.01)
USPC ........... 342/179; 342/175; 342/176; 342/180; 342/195; 345/4; 345/6; 345/30; 345/55; 345/84; 345/107

(58) Field of Classification Search
CPC .............. G09G 3/344; G09G 2300/02; G09G 2300/023; G09G 2300/026; G02F 1/167
USPC .............. 342/29–51, 165–186, 195; 345/2.2, 345/204, 4, 5, 6, 30, 55, 84, 87, 90, 92, 93, 345/98, 100, 418, 581, 618, 1.1–3.4, 31, 33, 345/48, 107, 419, 420, 421, 422, 690; 250/306, 307, 310, 311; 348/49, 80, 348/553, 563–570, 42, 51, 735; 378/54, 69, 378/43; 356/392, 398; 359/368, 237, 238, 359/290, 296; 701/1, 3, 14; 315/291; 349/10, 33, 54–56, 84, 158
See application file for complete search history.

(56) References Cited

U.S. PATENT DOCUMENTS 3,829,838 A * 8/1974 Lewis et al. .................... 345/419
4,562,433 A * 12/1985 Biferno ............................. 345/4
(Continued)

OTHER PUBLICATIONS

Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.
(Continued)

*Primary Examiner* — Bernarr Gregory

(57) ABSTRACT

One aspect relates to determining a position of at least one positional display element that can be used to display at least an image portion; and displaying the at least the image portion with the at least one positional display element based at least in part on the determining the position of the at least one positional display element. Another aspect relates to determining a position of at least one positional display element, in which the position can be used to affect a visual presentation.

45 Claims, 17 Drawing Sheets

(51) Int. Cl.
*G06T 11/60* (2006.01)
*G01S 7/00* (2006.01)
*G02F 1/00* (2006.01)
*G09G 3/00* (2006.01)

(56) References Cited

U.S. PATENT DOCUMENTS

| | | | | |
|---|---|---|---|---|
| 4,568,928 | A * | 2/1986 | Biferno | 345/5 |
| 4,851,827 | A * | 7/1989 | Nicholas | 345/93 |
| 4,922,240 | A * | 5/1990 | Duwaer | 345/100 |
| 5,062,690 | A * | 11/1991 | Whetten | 349/55 |
| 5,072,215 | A * | 12/1991 | Brotz | 345/6 |
| 5,132,677 | A * | 7/1992 | Nicholas | 345/92 |
| 5,162,931 | A * | 11/1992 | Holmberg | 349/54 |
| 5,173,792 | A * | 12/1992 | Matsueda | 349/54 |
| 5,392,143 | A * | 2/1995 | Akiyama et al. | 349/55 |
| 5,559,528 | A * | 9/1996 | Ravid et al. | 345/618 |
| 5,650,800 | A | 7/1997 | Benson | |
| 5,815,303 | A * | 9/1998 | Berlin | 349/158 |
| 5,999,227 | A * | 12/1999 | Doherty et al. | 348/564 |
| 6,112,140 | A * | 8/2000 | Hayes et al. | 701/3 |
| 6,208,247 | B1 | 3/2001 | Agre et al. | |
| 6,300,932 | B1 * | 10/2001 | Albert | 345/107 |
| 6,426,737 | B1 * | 7/2002 | MacLean et al. | 345/107 |
| 6,735,630 | B1 | 5/2004 | Gelvin et al. | |
| 6,816,862 | B2 | 11/2004 | Mulgund et al. | |
| 6,832,138 | B1 * | 12/2004 | Straub et al. | 701/3 |
| 6,842,672 | B1 * | 1/2005 | Straub et al. | 701/3 |
| 6,985,801 | B1 * | 1/2006 | Straub et al. | 701/3 |
| 7,012,382 | B2 * | 3/2006 | Cheang et al. | 315/291 |
| 7,015,893 | B2 * | 3/2006 | Li et al. | 345/107 |
| 7,271,533 | B2 * | 9/2007 | Carter et al. | 313/503 |
| 7,869,117 | B2 * | 1/2011 | Choi et al. | 359/296 |
| 7,903,061 | B2 * | 3/2011 | Zhang et al. | 345/84 |
| 2002/0040639 | A1 | 4/2002 | Duddleson et al. | |
| 2003/0172221 | A1 | 9/2003 | McNeil | |
| 2003/0236866 | A1 | 12/2003 | Light | |
| 2004/0005889 | A1 | 1/2004 | Nishimura et al. | |
| 2004/0227694 | A1 * | 11/2004 | Sun et al. | 345/6 |

OTHER PUBLICATIONS

Berkeley Webs: Wireless Embedded Systems, "Publications", p. 1-3, located at http://webs.cs.berkeley.edu/publications.html, printed on Apr. 12, 2004.
Buonadonna, Phillip; Hill, Jason; Culler, David; "Active Message Communication for Tiny Networked Sensors," pp. 1-11, printed on Mar. 8, 2004.
Center for the Built Environment, "XYZ on a Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.
Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.
Gay, David; Levis, Phil; Von Behren, Robert; Welsh, Matt; Brewer, Eric; and Culler, David, "The nesCLanguage: A Holistic Approach to Network Embedded Systems," pp. 1-10; Intel Research Berkeley, The Intel Corporation, Nov. 2002.
Gelsinger, Pat; Intel.com, "Expanding Moore's Law with Convergance" pp. 1-4 located at http://www.intel.com/labs/features/em101031.htm, printed on Apr. 9, 2004.
Gibson, William; "U2 's City of Blinding Lights"; Wired Magazine 13.08; pp. 1-7; located at http://wired-vig.wired.com/wired/archive/13.08/u2_pr.html; The Condé Nast Publications Inc. and Lycos, Inc.; bearing copyright dates of 1993-2005 and 2005, printed on Nov. 29, 2005.
Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000.

Intel.Com,; "Exploratory Research Deep Networking" pp. 1-10 located at http://www.intel.com/research/exploratory/heterogenerous.htm, printed on Mar. 25, 2004.
Intel.com; "Intel Research Seattle Handheld RFID Reader and Glove"; pp. 1-4; located at http://seattleweb.intel-research.net/projects/guide/projects/iglove/RFIDglove.htm; printed on Aug. 18, 2005.
ISIS NEST: Institute for Software Integrated Systems; "People: The NEST Group", pp. 1 of 1, located at http://www.isis.vanderbilt.edu/projects.nest/people.html, printed on Apr. 14, 2004.
Jenkins, Chad; "Actuated Sensor Networks"; Brown Computer Science WiCS Lunch; Nov. 3, 2004; Brown University; located at www.cs.brown.edu/~cjenkins/tmp/actuated_sensornets.pdf.
Johnson, R. Colin, "Companies test prototype wireless-sensor nets" EE Times, pp. 1-3, printable version of article located at http://www.eet.com/article/showArticle.jhtml?articleID-9900910, bearing a date of Jan. 29, 2003, printed on Jan. 27, 2004.
Kahn, Kelvin C.; Culler, David E.; "Ad Hoc Sensor Networks a New Frontier for Computing Applications" bearing a date of Apr. 2002, printed on Apr. 9, 2004.
Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.
Levis, Philip; Culler, David; "Maté: A Tiny Virtual Machine for Sensor Networks", pp. 1-11, printed Apr. 12, 2004.
Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.
Levis, Philip; Patel, Neil; Culler, David; Shenker, Scott; "Trickle: A Self-Regulating Algorithm for Code Propagation and Maintenance in Wireless Sensor Networks", printed on Apr. 13, 2004.
Levis, Philip, "Viral Code Propagation in Wireless Sensor Networks," EECS Department, University of California at Berkeley, printed on Mar. 8, 2004.
Liscano, Ramiro, "Service Discovery in Sensor Networks: An Overview"Powerpoint Presentation; pp. 1-51; School of Information Technology and Engineering, University of Ottawa, Ottawa, Canada, bearing a date of 2003, printed on Mar. 8, 2004.
"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.
Madden, Samuel, "Acquisitional Query Processing in TinyDB" Powerpoint Presentation, pp. 1-51; NEST Winter Retreat 2003, printed on Mar. 8, 2004.
Madden, Samuel, "Challenges in Sensor Network Query Processing" Powerpoint Presentation at the Jan. 15, 2002 NEST Retreat, printed on Mar. 8, 2004.
Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.
Madden, Samuel; Szewczyk, R.; Franklin, Michael; Culler, David "Supporting Aggregate Queries Over Ad-Hoc Wireless Sensor Networks" Powerpoint Presentation, pp. 1-47, 4$^{th}$ IEEE Workshop on Mobile Computing, dated Jun. 21, 2002.
Madden, Samuel; Franklin, Michael J.; Hellerstein, Joseph; M., and Hong, Wei, "The Design of an Acquisitional Query Processor for Sensor Networks," pp. 1-14, SIGMOD, Jun. 2003.
Marks, Paul; "Living Camera Uses Bacteria to Capture Image"; NewScientist.com; pp. 1-2; located at http://www.newscientist.com/article.ns?id=dn8365&print=true; bearing a date of Nov. 23, 2005, printed on Nov. 29, 2005.
Niculescu, Dragos; Nath, Badri; "Ad Hoc Positioning System (APS) Using AOA"; DataMan Lab Rutgers University; IEEE INFOCOM 2003.
Raghunathan, Vijay; Kansal, Aman; Hsu, Jason; Friedman, Jonathan; Srivastava, Mani; "Design Considerations for Solar Energy Harvesting Wireless Embedded Systems"; pp. 1-6; Networked and Embedded Systems Lab (NESL), Department of Electrical Engineering, University of California, Los Angeles, CA 90095.

(56) References Cited

OTHER PUBLICATIONS

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Roundy, Shad; Steingart, Dan; Frechette, Luc; Wright, Paul; Rabaey, Jan; "Power Sources for Wireless Sensor Networks"; pp. 1-24.

Ryer, Alex; *Light Measurement Handbook*, http://www.intl-light.com/handbook; pp. 1-64, copyright 1997, printed on Mar. 8, 2004.

Searchnetworking.com Definitions, "Jini" pp. 1-3 located at http://searchnetworkina.techtarget.com/sDefinition/0..sid7_gci212422.00.html, bearing a date of Apr. 10, 2003, printed on Mar. 8, 2004.

Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004.

Steingart, Dan; "Micro Power Systems Overview"; pp. 1-24; located at www.cs.berkeley.edu~binetude/NEST/feb6.ppt.

Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.

Woo, Alec; Tong, Terence; and Culler, David, "Taming the Underlying Challenges of Reliable Multihop Routing in Sensor Networks," pp. 1-14, SenSys '03, Nov. 5-7, 2003, Los Angeles, California, USA.

Zapisek, John; "Energy-Efficient Methods for Wireless Sensor Networks"; pp. 1-17; located at http://www.ics.uci.edu/~jzap/243e/proj/jzapisek_final.html; bearing a date of Spring 2004; printed on Aug. 18, 2005.

Zhao, Feng; Guibas, Leonidas J.; *Wireless Sensor Networks: An Information Processing Approach*. San Francisco: Morgan Kaufmann Publishers-Elsevier Inc., bearing a copyright date of 2004.

Grabowski, Bob; Navarro-Serment, Luis; Bererton, Curt; "Localization—Millibots"; Carnegie Mellon University; printed on Sep. 19, 2005; pp. 1-5; located at http://www.contrib.andrew.cmu.edu/~rjg/millibots/millibot_localization.html.

Jiang, Xiaofan; Polastre, Joseph; Culler, David; "Perpetual Environmentally Powered Sensor Networks"; Proceedings of the $4^{th}$ ACM/IEEE International Conference on Information Processing in Sensor Networks (IPSN 2005); Apr. 2005; pp. 1-6; University of California, Berkeley Computer Science Department, Berkeley, CA 94720.

Lorincz, Konrad; Welsh, Matt; "MoteTrack: A Robust, Decentralized Approach to RF-Based Location Tracking"; Proceedings of the International Workshop on Location and Context-Awareness (LoCA 2005); May 2005; pp. 1-17; Harvard University School of Engineering and Applied Sciences, Cambridge, MA, USA.

Raghunathan, Vijay; Kansal, Aman; Hsu, Jason; Friedman, Jonathan; Srivastava, Mani; "Design Considerations for Solar Energy Harvesting Wireless Embedded Systems"; bearing a date of 2005; pp. 1-6; Networked and Embedded Systems Lab (NESL), Department of Electrical Engineering, University of California, Los Angeles, CA 90095.

Roundy, Shad; Steingart, Dan; Frechette, Luc; Wright, Paul; Rabaey, Jan; "Power Sources for Wireless Sensor Networks"; $1^{st}$ European Workshop on Wireless Sensor Networks; Jan. 19-21, 2004; pp. 1-24.

Steingart, Dan; "Micro Power Systems Overview"; bearing a date of 2002-2004; pp. 1-24; UC Berkeley; located at www.cs.berkeley.edu/~binetude/NEST/feb6.ppt.

Whitehouse, Kamin; Jiang, Xiaofan; "Calamari: a sensor field localization system"; University of California at Berkeley; printed on Sep. 19, 2005; located at www.cs.berkeley.edu/~kamin/calamari/.

Alonso-Mora; Breitenmoser; Rufli; Beardsley; Siegwart; "Optimal Reciprocal Collision Avoidance for Multiple Non-Holonomic Robots"; Autonomous Systems Laboratory (ASL)/Disney Research; Zurich, Jan. 1, 2012, p. 1-14.

Alonso-Mora; Breitenmoser; Rufli; Haag; Caprari; Siegwart; Breadsley; "DisplaySwarm: A robot swarm displaying images IROS 2011 open research demonstration"; Autonomous Systems Laboratory (ASL)/Disney Research/GCTronic; Zurich & Lugano, Jan. 1, 2012, p. 1-2.

Alonso-Mora; Breitenmoser; Rufli; Siegwart; Beardsley; "Multi-Robot System for Artistic Pattern Formation"; Autonomous Systems Lab (ASL)/Disney Research; Zurich, Jan. 1, 2012, p. 1-6.

Alonso-Mora; Breitenmoser; Beardsley; Siegwart; "Reciprocal Collision Avoidance for Multiple Car-like Robots"; ALTOM/Autonomous Systems Lab (ASL)/Disney Research; Zurich, Jan. 1, 2012, p. 1-7.

Beardsley; Mora; Breitenmoser; Rufli; Siegwart; "Display Swarm"; Disney Research; http://www.disneyresearch.com/project/display-swarm/; Jan. 1, 2012, p. 1-3.

Sorokanich, Robert; "Disney's Pixelbots Turn a Flat Surface Into a Moving Dot-Matrix Display"; Gizmodo; http://gizmodo.com/disney-pixelbots-turn-a-flat-surface-into-a-moving-dot-1574551137; May 10, 2014; p. 1-4.

\* cited by examiner

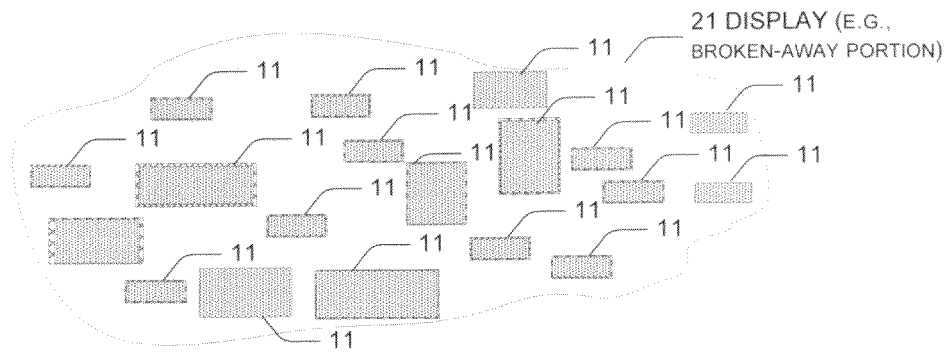
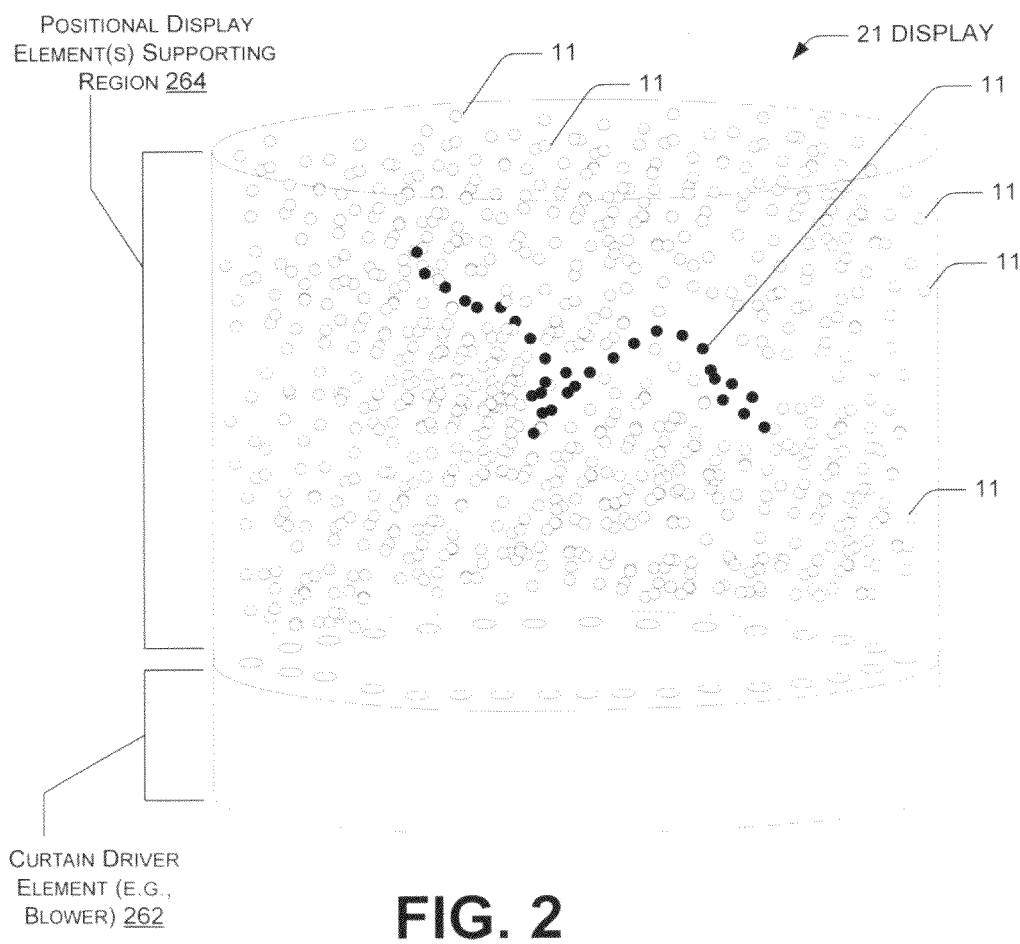

| 17a |
|-----|
| 17b |
| 17c | Key To FIG. 17

2000 ⟶  (A)

↓ wherein the determining a position of at least one positional display element that can be used to display at least an image portion is performed at least partially at the at least one positional display element 2032

↓ wherein the determining a position of at least one positional display element that can be used to display at least an image portion is performed at least partially at a device that is distinct from the at least one positional display element 2036

↓ wherein the at least one positional display element is secured with respect to a group including at least one of a connector, a mesh, or a fabric 2038

↓ wherein the at least one positional display element includes at least one from a group including a mote display element, an LCD-based display element, or a plasma-based display element 2040

↓ arranging a plurality of the at least one positional display elements in a regular array 2042

↓ arranging a plurality of the at least one positional display elements in an irregular configuration 2044

↓ compensating an irregular attribute of the at least one positional display element with respect to at least one other positional display element 2045

↓ arranging a plurality of the at least one positional display elements in an irregular pattern 2046

| compensating an irregular intensity of the at least one positional display element with respect to at least one other positional display element, in which the irregular intensity at least partially results from the arranging the plurality of the at least one positional display elements in the irregular pattern 2048 | compensating an irregular conformation of the at least one positional display element with respect to at least one other positional display element at least partially by employing the locations of the at least one positional display element to compensate the irregular conformation 2052 | compensating an irregular orientation of the at least one positional display element with respect to at least one other positional display element at least partially by employing the locations of the at least one positional display elements to compensate the irregular orientation 2056 | compensating an irregular attribute of the at least one positional display element with respect to at least one other positional display element at least partially by employing the locations of the at least one positional display elements to compensate the irregular attribute 2060 |

(B)    (B)    FIG. 17b    (B)    (B)

| 17a |
|-----|
| 17b |
| 17c | Key To FIG. 17

2000 ⟶

```
allowing at least a first one of the at least one positional display element to be displaced with
respect to at least a second one of the at least one positional display element, wherein the at
least the first one of the at least one positional display element and the at least the second
one of the at least one positional display element could be utilized in the displaying the at
least the image portion both prior to or after the allowing the at least the first one of the at
                least one positional display element to be displaced 2062
```

| addressing at least one positional display element that can be used to derive an addressed position of the at least one positional display element 2202 |

| displaying at least a portion of an image using the at least one positional display element based at least in part on the addressing the at least one positional display element that can be used to derive the addressed position of the at least one positional display element 2203 |

```
wherein the addressing the at least one positional display element is performed at least
                  partially at the at least one positional display element 2204
```

```
wherein the addressing the at least one positional display element is performed at least
          partially at a device that is distinct from the at least one positional display element 2205
```

```
further comprising allowing at least a first one of the at least one positional display element
to be displaced with respect to at least a second one of the at least one positional display
element, wherein the at least the first one of the at least one positional display element and
the at least the second one of the at least one positional display element could be utilized in
the displaying the at least the portion of the image both prior to or after the allowing the at
          least the first one of the at least one positional display element to be displaced 2206
```

```
wherein the addressing at least one positional display element that can be used to derive an
    addressed position of the at least one positional display element is performed at least
              partially within the at least one positional display element 2207
```

| 18a |
|-----|
| 18b | Key To FIG. 18

> wherein the addressing at least one positional display element that can be used to derive an addressed position of the at least one positional display element is performed at least partially in a controller device that is operationally situated externally to the at least one positional display element 2208

> wherein the displaying at least a portion of an image using the at least one positional display element is performed at least partially within the at least one positional display element 2210

> wherein the displaying at least a portion of an image using the at least one positional display element is performed at least partially in a controller device that is operationally situated externally to the at least one positional display element 2212

| 18a |
| 18b | Key To FIG. 18  FIG. 18b

2600 ─┐ displaying at least an image portion using at least one displaceable positional display element, wherein the at least one displaceable positional display element displays the at least the image portion considering an ephemeral position of the at least one displaceable positional display element with respect to an image including the at least the image portion, wherein the ephemeral position can be a result of both changes in a physical location of the at least one displaceable positional display element and changes in a location of the image 2602

> allowing at least a first one of the at least one displaceable positional display element to be displaced with respect to at least a second one of the at least one displaceable positional display element, wherein the at least the first one of the at least one displaceable positional display element and the at least the second one of the at least one displaceable positional display element could be utilized in the displaying the at least the image portion both prior to or after the allowing the at least the first one of the at least one displaceable positional display element to be displaced 2604

```
addressing at least one positional display element that can be used to derive an addressed
position of the at least one positional display element 2402
```
↓
```
affecting a visual presentation at least partially using the at least one positional display
element based at least in part on the addressing the at least one positional display element
that can be used to derive the addressed position of the at least one positional display
element 2404
```
↓
further comprising allowing at least a first one of the at least one positional display element to be displaced with respect to at least a second one of the at least one positional display element, wherein the at least the first one of the at least one positional display element and the at least the second one of the at least one positional display element could be utilized in the affecting the visual presentation both prior to or after the allowing the at least the first one of the at least one positional display element to be displaced 2406

↓
wherein the addressing at least one positional display element that can be used to derive an addressed position of the at least one positional display element is performed at least partially within the at least one positional display element 2408

↓
wherein the addressing at least one positional display element that can be used to derive an addressed position of the at least one positional display element is performed at least partially in a controller device that is operationally situated externally to the at least one positional display element 2410

↓
wherein the affecting a visual presentation at least partially using the at least one positional display element is performed at least partially within the at least one positional display element 2412

↓
wherein the affecting a visual presentation at least partially using the at least one positional display element is performed at least partially in a controller device that is operationally situated externally to the at least one positional display element 2414

- arranging at least one positional display element in an irregular pattern 2702
  - suspending the at least one positional display element in a suspending media 2712
  - attaching the at least one positional display element to a substrate 2714
  - allowing motion of the at least one positional display element 2716
  - maintaining the at least one positional display element in a substantially fixed position 2718

↓ determining a relative position of the at least one positional display element that have been arranged in the irregular pattern 2704

↓ displaying at least a portion of an image at least partially in response to the determining the relative position of the at least one positional display element that have been arranged in the irregular pattern 2706

↓ further comprising allowing at least a first one of the at least one positional display element to be displaced with respect to at least a second one of the at least one positional display element, wherein the at least the first one of the at least one positional display element and the at least the second one of the at least one positional display element could be utilized in the displaying the at least the portion of the image both prior to or after the allowing the at least the first one of the at least one positional display element to be displaced 2710

FIG. 21

2800 ⟶ compensating for an undesired or incorrect operation of a first positional display element by altering a display operation of a second positional display element 2802

↓ wherein the second positional display element is a neighbor of the first positional display element 2804

↓ further comprising polling the first positional display element to determine the undesired or incorrect operation of the first positional display element 2806

| compensating for a non-uniform configuration of a plurality of positional display elements 2902 |

| providing a display at least partially including a plurality of positional display elements arranged in a non-uniform configuration 3002 |

| securing the plurality of positional display elements to a substrate 3010 |

| supporting the plurality of positional display elements by a fluid curtain 3012 |

| compensating for the non-uniform configuration between the plurality of positional display elements 3014 |

| establishing a supply to support at least one suspended positional display element 3202 |

| generating an image at least partially by controlling actuation of the at least one suspended positional display element depending at least in part on their relative positions 3204 |

FIG. 25

POSITIONAL DISPLAY ELEMENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

The present application is a continuation in part of U.S. patent application Ser. No. 11/343,800, entitled POSITIONAL DISPLAY ELEMENTS, naming Edward K. Y. Jung, Royce A. Levien, Robert W. Lord, Mark A. Malamud, and John D. Rinaldo, Jr. as inventors, filed on Jan. 30, 2006, now abandoned, but which, at the time of filing of the present application, was currently co-pending, or was an application of which a currently co-pending application was entitled to the benefit of the filing date.

SUMMARY

In certain aspects, a method can include, but is not limited to, determining a position of at least one positional display element that can be used to display at least an image portion; and displaying the at least the image portion with the at least one positional display element based at least in part on the determining the position of the at least one positional display element. In addition to the foregoing, other method aspects are described in the claims, drawings, and text forming a part of the present application.

In certain aspects, a method can include, but is not limited to, addressing at least one positional display element that can be used to derive an addressed position of the at least one positional display element; and displaying at least a portion of an image using the at least one positional display element based at least in part on the addressing the at least one positional display element that can be used to derive the addressed position of the at least one positional display element. In addition to the foregoing, other method aspects are described in the claims, drawings, and text forming a part of the present application.

In certain aspects, a method can include, but is not limited to, addressing at least one positional display element that can be used to derive an addressed position of the at least one positional display element; and affecting a visual presentation at least partially using the at least one positional display element based at least in part on the addressing the at least one positional display element that can be used to derive the addressed position of the at least one positional display element. In addition to the foregoing, other method aspects are described in the claims, drawings, and text forming a part of the present application.

In certain aspects, a method can include, but is not limited to, displaying at least an image portion using at least one displaceable positional display element, wherein the at least one displaceable positional display element displays the at least the image portion considering an ephemeral position of the at least one displaceable positional display element with respect to an image including the at least the image portion, wherein the ephemeral position can be the result of both changes in a physical position of the at least one displaceable positional display element and changes in a position of the image. In addition to the foregoing, other method aspects are described in the claims, drawings, and text forming a part of the present application.

In certain aspects, a method can include, but is not limited to, arranging at least one positional display element in an irregular pattern; determining a relative position of the at least one positional display element that have been arranged in the irregular pattern; and displaying at least a portion of an image at least partially in response to the determining the relative position of the at least one positional display element that have been arranged in the irregular pattern. In addition to the foregoing, other method aspects are described in the claims, drawings, and text forming a part of the present application.

In certain aspects, a method can include, but is not limited to, compensating for an undesired or incorrect operation of a first positional display element by altering a display operation of a second positional display element. In addition to the foregoing, other method aspects are described in the claims, drawings, and text forming a part of the present application.

In certain aspects, a method can include, but is not limited to, compensating for a non-uniform configuration of a plurality of positional display elements. In addition to the foregoing, other method aspects are described in the claims, drawings, and text forming a part of the present application.

In certain aspects, a method can include, but is not limited to, providing a display at least partially including a plurality of positional display elements arranged in a non-uniform configuration. In addition to the foregoing, other method aspects are described in the claims, drawings, and text forming a part of the present application.

In certain aspects, a method can include, but is not limited to, establishing a supply to support at least one suspended positional display element; and generating an image at least partially by controlling actuation of the at least one suspended positional display element depending at least in part on their relative positions. In addition to the foregoing, other method aspects are described in the claims, drawings, and text forming apart of the present application.

In certain aspects, an apparatus can include, but is not limited to, at least one positional display element configurable to derive an addressed position of the at least one positional display element; and the at least one positional display element configurable to display at least a portion of an image based at least in part on the at least one positional display element configurable to derive the addressed position of the at least one positional display element. In addition to the foregoing, other apparatus aspects are described in the claims, drawings, and text forming a part of the present application.

In certain aspects, an apparatus can include, but is not limited to, at least one positional display element configurable to derive an addressed position of the at least one positional display element; and the at least one positional display element configurable to affect a visual presentation based at least in part on the at least one positional display element configurable to derive the addressed position of the at least one positional display element. In addition to the foregoing, other apparatus aspects are described in the claims, drawings, and text forming a part of the present application.

In certain aspects, an apparatus can include, but is not limited to, at least one positional display element configurable to be arranged in an irregular configuration; a positioning portion configurable to determine a position of the at least one positional display element; and the at least one positional display element configurable to display at least a portion of an image at least partially in response to the positioning portion configurable to determine the position of the at least one positional display element. In addition to the foregoing, other apparatus aspects are described in the claims, drawings, and text forming a part of the present application.

In certain aspects, an apparatus can include, but is not limited to, positioning means configurable to determine a position of at least one positional display element; and displaying means configurable to generate at least a portion of an image at least partially by controlling actuation of at least one suspended positional display element depending at least in part on their relative positions. In addition to the foregoing other apparatus aspects are described in the claims, drawings, and text forming a part of the present application.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 is a diagram of one embodiment of a display including at least one positional display element that are secured to a substrate;

FIG. 2 is a diagram of one embodiment of the display, arranged in three dimensions, including the at least one positional display element;

FIG. 17, that includes FIGS. 17a, 17b, and 17c, is a high-level flowchart of one embodiment of a positional display element technique;

FIG. 18, that includes FIGS. 18a and 18b, is a high-level flowchart of one embodiment of a positional display element addressing technique;

FIG. 19 is a high-level flowchart of one embodiment of a positional display element addressing technique;

FIG. 20 is a high-level flowchart of one embodiment of a positional display element displaying technique;

FIG. 21 is a high-level flowchart of one embodiment of a positional display element arranging technique;

FIG. 22 is a high-level flowchart of one embodiment of a positional display element compensating technique;

FIG. 23 is a high-level flowchart of one embodiment of a positional display element compensating technique;

FIG. 24 is a high-level flowchart of one embodiment of a positional display element displaying technique;

FIG. 25 is a high-level flowchart of one embodiment of a suspended positional display element displaying technique.

DETAILED DESCRIPTION

Figure 3:
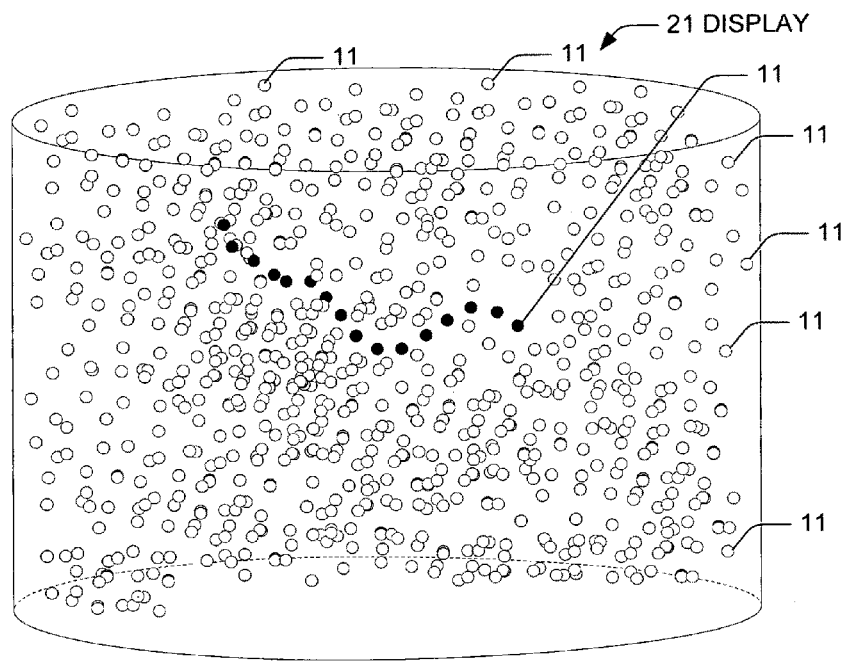
FIG. 3 is a diagram of another embodiment of the display, arranged in three-dimensions, including the at least one positional display element.

This disclosure relates, in general, to displays including at least one positional display element.

In the following detailed description, reference is made to the accompanying drawings, which form a part thereof. In the drawings, similar symbols typically identify similar components, unless the context dictates otherwise. The illustrative embodiments described in the detailed description, drawings, and claims are not meant to be limiting. Other embodiments may be utilized, and other changes may be made, without departing from the spirit or scope of the subject matter presented here.

The disclosure includes a number of formal outline headings and different embodiments for clarity of presentation. However, the outline headings and the different embodiments are for presentation purposes, and different types of subject matter may be discussed throughout the different portions of the disclosure. For example, device(s)/structure(s) may be described under process(es)/operations heading(s) and/or vice versa. Also, descriptions of single topics may span two or more topic headings. Hence, the use of the formal outline headings and the different embodiments are intended to be illustrative in nature and not in any way limiting in scope. The numbering of the various elements in the disclosure is intended to improve readability and understandability of the disclosure with respect to the drawing, and is not intended to be limiting in scope.

I. Examples of Uses of Positional Display Elements

Certain embodiments of this disclosure relate to a variety of embodiments of a display 21 as is described with respect to FIGS. 1-9, and other embodiments that include the at least one positional display element(s) 11. Certain embodiments of the display 21 can be configurable to display at least part of an image generated using the at least one positional display element(s) 11. Certain embodiments of the at least one positional display element(s) can determine what particular image or portion to display at least partially by determining the position of the at least one positional display element. In certain embodiments, display information can be used to determine the particular image, or portion thereof, for the positional display element(s) to generate. Certain embodiments of the display information can include, but are not limited to, display data, signals, messages, and/or other information.

Figure 7:
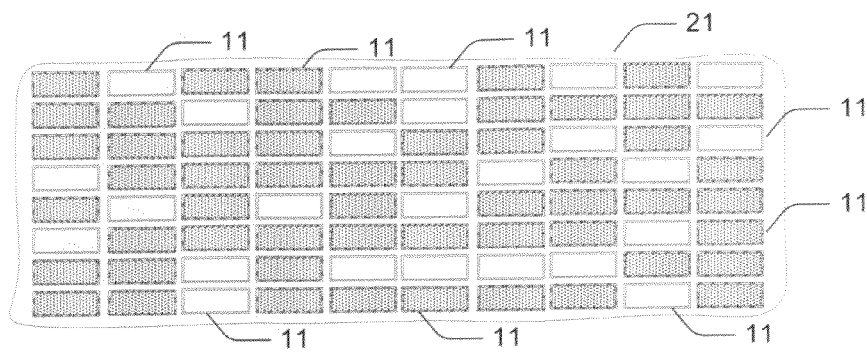
FIG. 7 is a diagram of still another embodiment of the display, including the at least one positional display element being arranged in a regular pattern.

As described with respect to this disclosure, certain ones of the positional display element(s) 11 within certain embodiments of the display 21 can be irregularly distributed as shown in FIGS. 1-4, regularly distributed as shown in FIG. 7, and/or randomly distributed across one, two, or three dimensions. As such, certain embodiments of the positioning of the positional display element(s) 11 can be formed in regular, irregular, and/or random spacing and/or configuration.

In certain embodiments of the displays, at least some displacement between positional display element(s) can be allowed. As such, certain positional display element(s) can be maintained in the substantially static state with respect to each other; or alternatively, the positional display element(s) can in certain embodiments be allowed to be displaced or move with respect to each other. Such movement or displacement between the positional display element(s) may occur at different rates and/or at different amounts in different embodiments, depending upon the operation, characteristics, and/or structure of the at least one positional display element(s). In certain display embodiments, by comparison, the positional display element(s) can be arranged in a regularly-spaced array configuration, such as less conventional television screens and/or computer displays.

Certain embodiments of the positional display element(s) 11, as described in this disclosure, can actuate a distinct light device or distinct element to affect the presentation and/or control a portion of the display. Other embodiments of the positional display element(s) 11 as described in this disclosure can include an integrated light device or integrated element to affect the presentation and/or control a portion of the display. Whether the light element is integrated in the positional display element, or represents a distinct element that is controlled by the positional display element can represent a design choice. Such variations of the positional display element(s) that can affect a presentation can be within the intended scope of the present disclosure, depending upon context.

Certain embodiments of the display 21 can display a wide variety of display information including but not limited to one or more of the moving images, still images, writing, information, data, etc. As such, any of these and other things that are generally known to be displayable can be displayed on the display 21.

One embodiment of the display 21, as illustrated (in FIG. 1 for example) and/or described in this disclosure, may represent a broken-away section of the entire display, and therefore can form a part of an entire display. As such, the display 21 can be arranged in any desirable shape, configuration, pattern or size of positional display element(s), density of positional display element(s), etc.

Certain embodiments of the dimensions of the positional display element(s) can be enlarged, reduced, or miniaturized compared to as illustrated with respect to FIG. 1. For instance, in certain embodiments of the display that are far from the viewer, the positional display element(s) may be large as compared to the positional display elements for displays close to the user. Very-Large-Scale Integration (VLSI) and other semiconductor processing techniques can be applied to fabricate a considerable number of certain embodiments of the positional display element(s) on a chip, either as discrete components and/or as integrated circuits. Such fabrication techniques, chip layouts, etc. are generally well understood by those skilled in the art, and will not be further detailed herein.

Certain embodiments of the positional display element(s) 11 included in the display 21 can be attached to a large variety of solid or flexible surfaces or substrates such as a wall, a window, a door, a table, furniture, a desk, a vehicle, etc. In different embodiments, the positional display element(s) can be attached to the solid or flexible surface by coating over the positional display element(s) using a clear or translucent adhesive, paint, epoxy, etc. at any locations that light generated by the positional display element(s) could pass through, or by affixing the positional display element(s) to a substrate or other surface using any suitable attachment, adhesive, fastener, etc. Certain embodiments of the at least one of the positional display element(s) can be supportable to be displaceable and/or free-floating within a confined region or container, such as by being supported by an air, gas, or liquid curtain, by being secured to a surface in an irregular configuration, or by having certain ones of the at least one positional display element(s) having different capabilities, and therefore can output different amounts of light. Certain embodiments of the positional display element(s) 11 can be free-floating in the air, atmosphere, or outer-space; or alternately can be tethered therein, and can be supported using balloons, propellers, spinners, or other suitably-sized levitative mechanisms as described with respect to FIG. 26, such as to form a display cloud. As such, there can be a variety of mechanisms to support or maintain the positional display element(s) 11 to form the display 21.

Certain embodiments of displays described in this disclosure relate to determining the position of the at least one positional display element(s), for example: relative to other positional display element(s), relative to some other device, relative to some geographic position (e.g., a position arrived using a global positioning system, radar, etc.), relative to a building or structure, relative to an individual, or relative to any other positionable-definable entity, etc. The position of each positional display element 11 can be determined at that positional display element, at another positional display element, and/or at another device such as a computer-based controller device. The concepts and embodiments of positional display elements, as described in this disclosure, can therefore be integrated or included in a wide variety of the display 21 including, but not limited to: a computer display or monitor, a television display, a movie display, a theater display, etc. Considering that displays relating to computers, televisions, movies, schools, presentation areas, etc. are well known, understood, and ubiquitous, it is envisioned that the concepts as described in this disclosure can be similarly modified to be largely encompassing of a large variety of similar types of displays.

The term "positional display element(s)" is similarly intended to be broadly interpreted, depending upon the particular context as described within this disclosure. Certain embodiments of the positional display element(s) can include such devices as mote(s), processor-based device(s), wireless display device(s), etc. Many aspects of the display 21, as described in this disclosure, can include positional display element(s) can include a variety of computer-based display systems. Certain ones of the different embodiments of the positional display element(s) can be configured using a variety of technologies. In certain embodiments as described in this disclosure, a number of the positional display element(s) can interface with each other and/or transmit data therebetween and to or from a computer/controller or other device as described in this disclosure.

The embodiment of the at least one positional display element(s) 11 can be arranged in a variety of configurations to at least partially form the display 21. In certain embodiments, the at least one positional display element(s) can be arranged in an irregular configuration similar to as described with respect to FIG. 1, such that certain positional display elements along one, two, or three dimensions. Since minor design variation are within the included scope of the present disclosure, the optical characteristics of certain positional display elements, the dimensions of certain positional display elements, and/or other such characteristics of certain positional display elements, and other such aspects can differ from other positional display elements. Certain types of the irregular configuration of certain positional display elements as compared to other positional display element(s) can be compensated. For example, if a first display area has a denser positional display element concentration than a second display area, and it is desired to provide a substantially uniform or consistent illumination in the first display area and the second display area, then at least one of the positional display element(s) of the second area may be configured to produce more light, in general, then at least one of the positional display element(s) of the first area. Such compensation techniques can be applied to compensate for a variety of optical, dimensional, spacing, and/or other similarly compensated irregularities.

In certain embodiments, certain ones of the positional display element(s) can be allowed to be displaced with respect to each other. Certain embodiments of the positional display elements can therefore change their position over time (such as by floating in water, oil, or another fluid, etc). In certain embodiments, the at least one positional display element(s) can be applied to and/or attached to a surface in a regular pattern, or an irregular configuration. A variety of techniques may be used to affix certain embodiments of the positional display element(s) to a substrate, or alternately support the positional display element(s). For example, certain embodiments of the positional display element(s) can be sufficiently small to be supported within a curtain, air supply, etc. to provide for relative easy displacement of the positional display element(s) with respect to each other. Other embodiments of the positional display element(s) can be applied using an adherent liquid (e.g., a clear adhesive or glue) to a surface or substrate. Such techniques as "adhering", "smoothing", "painting", "gluing", or other securing application processes can be used to secure the positional display elements.

At regular intervals those positional display element(s) 11 that are suspended, or floating in a fluid or curtain as described with respect to FIG. 2 (or are otherwise free to move), can determine their position or movement at a rate depending on how often and far the positional display element(s) move. For those positional display element(s) that remain substantially static (such as those that are attached or affixed to a wall), the position of the positional display element(s) may only have to be considered once. If irregular operations occur and/or are sensed in any embodiment of the display and/or the associated positional display element(s), then it may be desired to determine once again the position and the operation of at least one of the positional display element(s).

In certain embodiment(s), a variety of the movement and/or position of the positional display element(s) can be monitored using position sensing within that positional display element or another device (e.g., another positional display element or other device whose position and relative position is known). Such determining or movement of the position of the at least one positional display element(s) can be determined relative to each other in certain embodiments, relative to other devices such as a computer controller, relative to the display 21, and/or relative to some geographic, structural, building, or other definable position. Each of the at least one positional display element(s) can determine which display information (which can include, but is not limited to, displayed data, etc.) to display as a result of its determined position and/or motion. As such, it may represent one goal of the entire display to display certain display information such as a portion of the particular image using the at least one positional display element(s). One or more of the at least one positional display element(s) 11 can thereby combine to achieve the overall goal of the display 21 by displaying a portion of the display information depending upon its particular position. As, such a variety of embodiments of displays can be provided that are established by determining the position of at least some of the positional display element(s), and thereupon creating an image by determining which display should be provided by each one of the at least one positional display element(s).

The determination of the position of the positional display element(s) 11, which can thereupon be used to determine which display information to display therefrom, can be determined either within or partially within the positional display element(s) and/or within or partially within another device such as a computer/controller 18. There are a wide variety of embodiments in which the positional display element(s) can be situated either in a fixed position or in a movable position. Certain embodiments of the movable positional display element(s) are configured to be able to move (e.g., change position) at a relatively slow rate while other movable positional display element(s) are configurable to be able to move (e.g., change position) at a more, less, or similarly rapid rate, depending upon their particular application.

Certain embodiments of the positional display element(s) can be arranged in a variety of configurations as described in this disclosure. In one embodiment, multiple ones of the positional display elements can be uniformly-spaced, such as to form an array of the positional display elements. Certain embodiments of the positional display element(s) can be irregularly and/or randomly configured. As such, positional display element(s) can be secured and/or supported using a variety of techniques and in a variety of relative positions. For certain embodiments of the positional display element(s) that are not regularly configured (such as by having an irregular distribution, an irregular spacing, etc.), the intensity of, effect of, or other aspect of the light or other such electromagnetic radiation produced and/or controlled by each of the at least one positional display element(s) could compensate for the irregular distribution or pattern. A variety of embodiments of the positional display element(s) 11 may utilize such image compensation techniques that may compensate for a variety of irregular attributes including irregular spacing, irregular positioning, irregular intensity, malfunctioning positional display elements, etc.

This disclosure thereby provides a technique by which the at least one positional display element(s) may be either arranged in a stand-alone configuration and/or integrated with the display, etc. Certain embodiments of the positional display elements, as described in this disclosure, can communicate and/or transfer data with each other in a manner as is generally known by those skilled in networking technologies. A number of addressing techniques may be utilized by the positional display element(s) to determine the display information that should be displayed, and/or affect a visual presentation, based at least in part on received information. Such affecting the visual presentation can equate, depending on the context, to generating an image to be displayed. Certain embodiments of the addressing techniques can be used to achieve at least a portion of a goal for the display 21, which may be configured as a network of positional display element(s). An example of the portion of the goal for the display 21 that can be achieved by the at least one positional display element(s) can include, but is not limited to, depending upon the context, generating a portion of an image depending upon the current position of the positional display element(s) relative to an overall image.

Many embodiments of the positional display elements, as described in this disclosure, are therefore intended to display the at least a portion of the image that is to be provided by the display 21. Certain embodiments of the positional display element(s) can perform a large variety of other operations to affect a presentation (e.g. visual and/or non-visual) such as actuating one or more other devices and/or sensing one or more parameters. As such, one or more embodiments of the positional display element(s) can actuate one or more devices such as, described with respect to FIGS. 11 and 12, but not limited to, an antenna 12 that can transmit and/or receive signals, an electrical/magnetic device 142, a pressure device 144, a temperature device 156, a volume device 158, and/or an inertial device 160. Such positional display element(s) actuating operations may be controlled or actuated as described in this disclosure and may rely on, consider, and/or be improved by determining the position of the positional display element(s). Certain embodiments of the positional display element(s) can also be configured to sense the variety of parameters such as electro-magnetic waves, pressure values, temperature, volume, inertia, etc. These embodiments of devices and/or parameters are intended to be illustrative in nature, and not limiting in scope. Certain embodiments of the positional display element(s) can be configured to include, utilize, and/or interface with motes, sensor devices, controllers, processor-based devices, etc. as described above.

Certain embodiments of the positional display element(s) can therefore be configured to at least partially affect the visual presentation, which can equate, depending on context, to the displaying at least a portion of the image on the display 21. In addition, certain embodiments of the positional display element(s) can also be configured to affect the non-visual presentation. As such, the affecting the visual presentation and/or affect the non-visual presentation with the at least one positional display element(s) can represent a portion of the goal of the display 21.

Certain embodiments of the positional display element(s), such as those that are included in or actuated by motes, can be produced to have a relatively small dimension and/or relatively inexpensively. As the effective number and device density of positional display element(s) is increased, the resolution and/or quality of the image that can be achieved by certain embodiments of the positional display element(s) may increase. It is envisioned that many embodiments of the positional display element(s) could be affordably distributed in relatively dense configurations for a variety of applications, such as being able to produce an image. Distributing of a number of positional display element(s) may be performed in some happenstance or somewhat random fashion, resulting in relative imprecise situating of each positional display element(s). The process of precisely positioning of the positional display element(s) can, in certain instances, be quite expensive and difficult to perform. As such, this disclosure provides a number of techniques by which the position, or relative positions, of certain ones of the positional display element(s) can be determined once they are situated, and/or compensated for.

Figure 10:
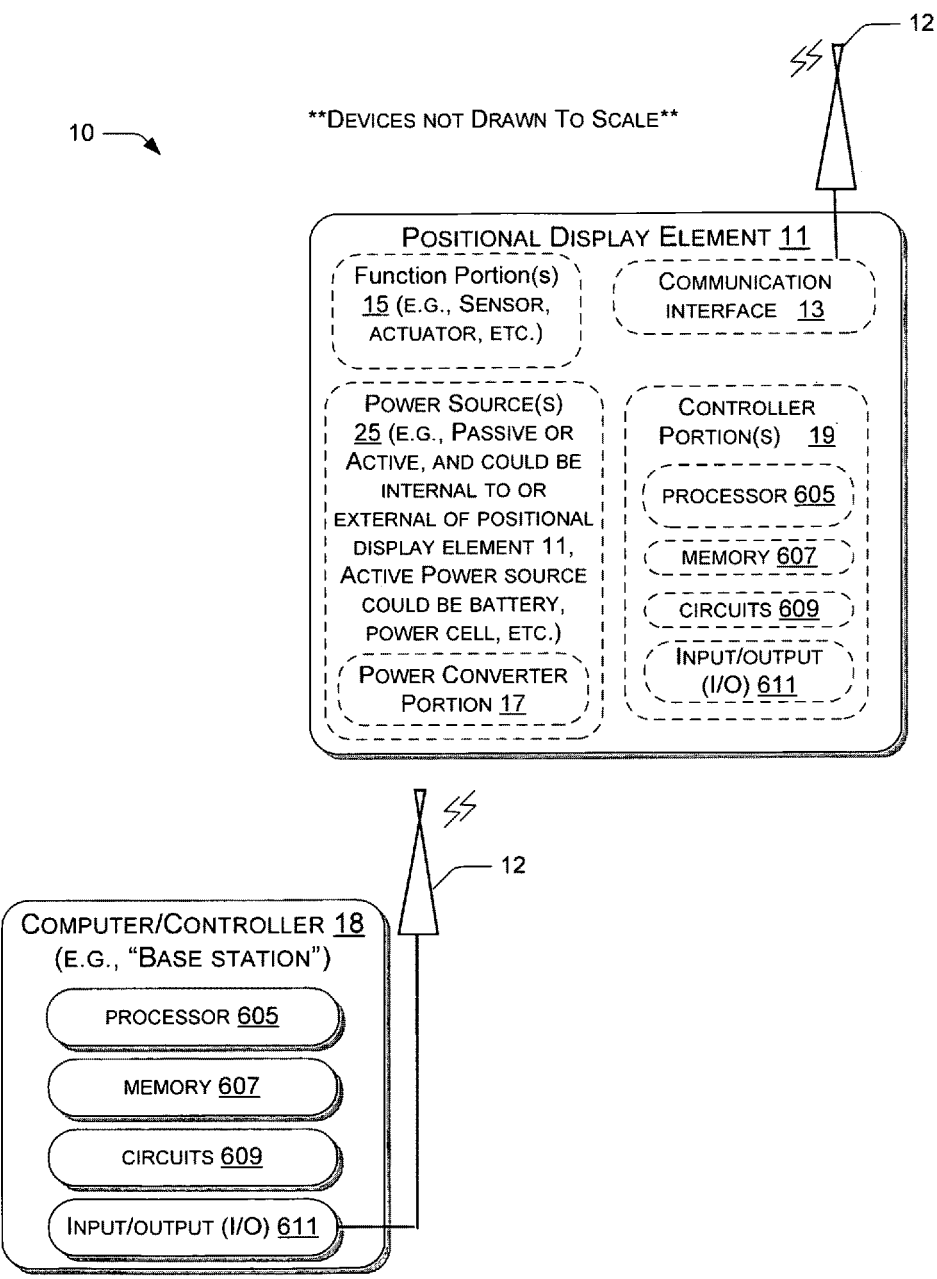
FIG. 10 is a schematic diagram of one embodiment of the at least one positional display element.
Figure 11:
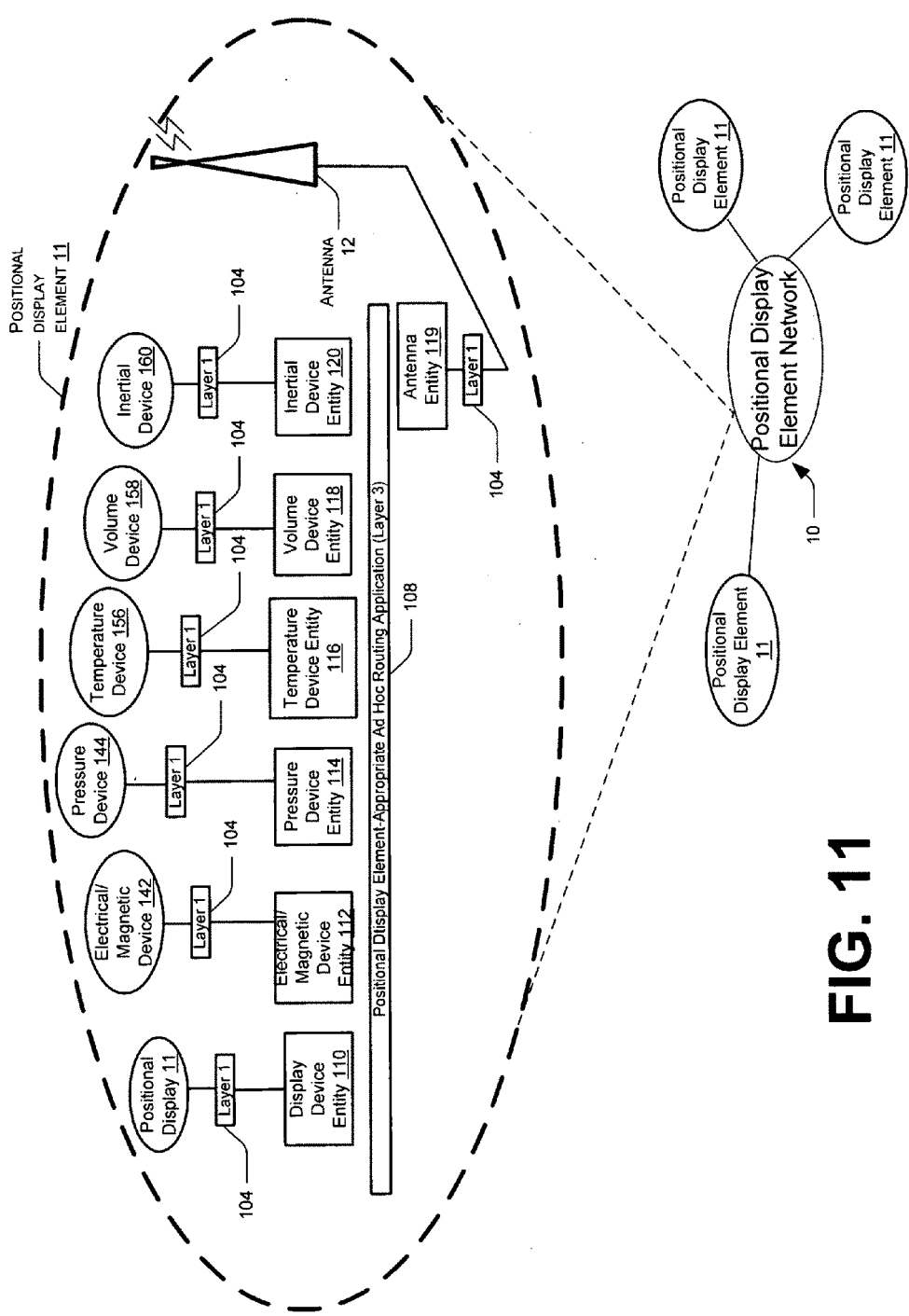
FIG. 11 is a schematic diagram of another embodiment of the at least one positional display element.
Figure 12:
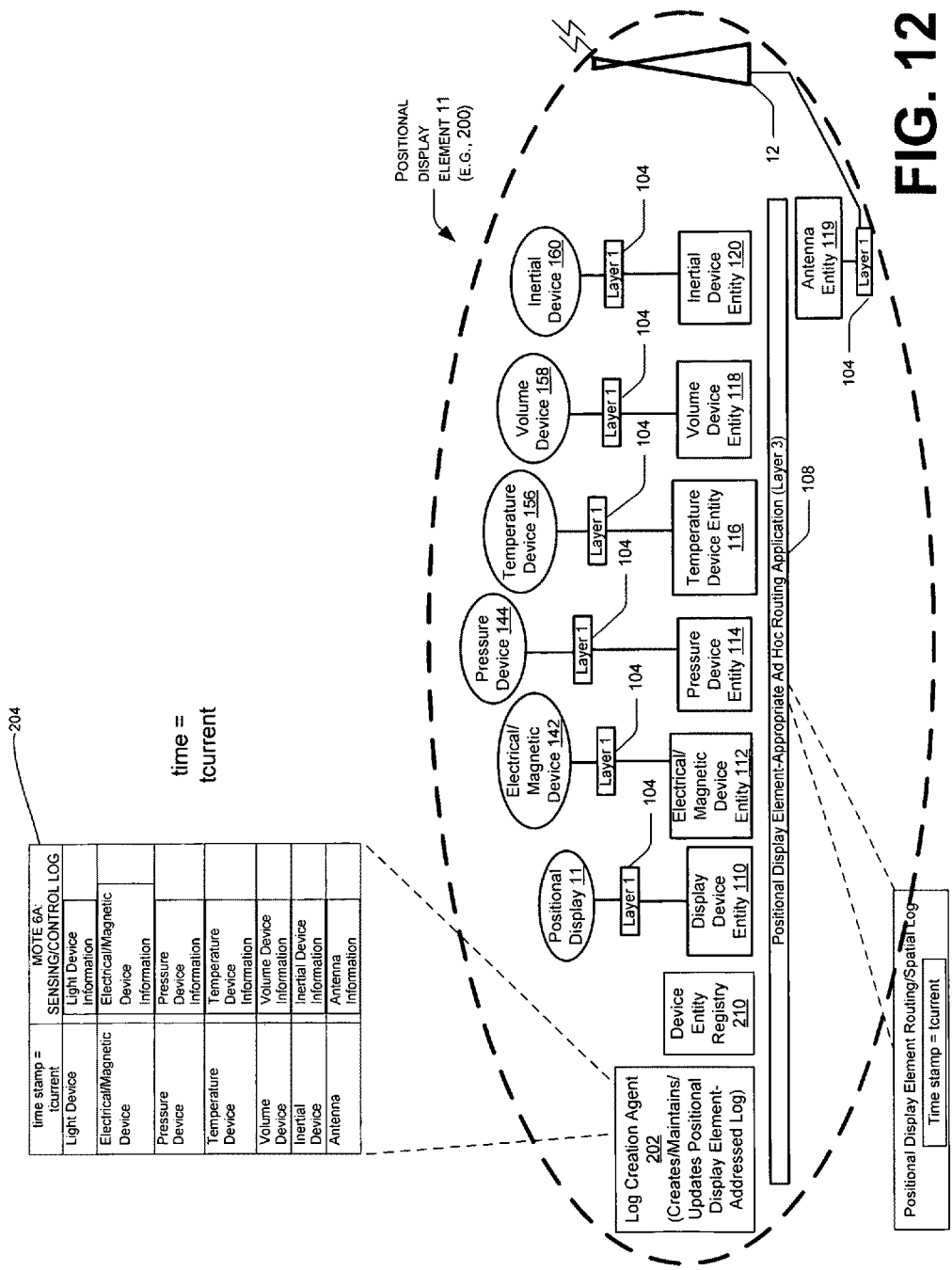
FIG. 12 is a schematic diagram of still another embodiment of the at least one positional display element.

Certain embodiments of the positional display element(s) may be configured as described in this disclosure with respect to FIGS. 10 to 12, and elsewhere. The positional display element(s) can be configured to allow for a variety of displaying, actuating, and/or sensing operations. One embodiment of a network 10 which together provides at least a portion of the display 21, and can include a number of the positional display element(s) 11, as described with respect to FIG. 10. It is envisioned that certain positional display element(s) for within the network 10 can transmit display information such as data and/or signals to other devices. Many embodiments of the positional display element(s) 11 can utilize wireless communications (e.g., in certain embodiments at radio frequencies) to establish communications therebetween.

Certain embodiments of the positional display element can include and/or be actuated to affect at least a portion of the visual presentation. Certain embodiments of the positional display element(s) can, depending on context, include at least one mote. Other embodiments of positional display element(s) may include a device other than the at least one mote. As used herein, the term "mote(s)" can, depending on context, indicate a semi-autonomous computing, communication, displaying, actuating, and/or sensing as described in the mote literature (e.g., Intel Corporation's mote literature) as well as those fabricated by Crossbow Technologies, Inc., as well as equivalents recognized by those having skill in the art (e.g., Intel Corporation's smart dust projects), similar to as illustrated with respect to FIGS. 10 to 12. Those embodiments of positional display element(s) that include in the/or interact with motes, as described in this disclosure, are intended be illustrative in nature and not limiting in scope.

While motes are described inherent as being included in certain embodiments of the positional display element(s) 11, it is be understood that other embodiments of the positional display element(s) may not include one or more motes. In certain instances, whether a particular processing entity is or is not a mote may be subject to interpretation. In certain embodiments, it may be desired to physically separate a portion of the positional display element(s) that performs processing on display information from that portion of positional display element(s) that displays as a result of the received display information. In certain embodiments, it may be desired to utilize different technology from the mote technology to more effectively affect the visual presentation to achieve greater resolution, provide a more responsive display response, and/or otherwise improve, alter, or quicken the imaging, positioning, or displaying processes.

A variety of wireless communication techniques can thereby be applied to a variety of networked positional display element(s). Certain embodiments of the positional display element(s) 11 can be configured to affect a variety of the visual presentation(s). Such display information that can be used to affect the visual presentation can be transmitted, utilizing wireless (and/or in certain embodiments wired-based) communication techniques, between the at least one positional display element(s) 11 and/or, in certain embodiments, one or more computers/controllers 18 as described with respect to FIG. 10.

Different embodiments of the positional display element(s) can be arranged in a variety of regular, irregular, and/or randomized configurations, perform a variety of operations, be constructed utilizing a variety of techniques and/or technologies, and be sized in a variety of dimensions. For instance, FIG. 2 illustrates an embodiment of the display 21 that includes the at least one (e.g., a plurality of) positional display element(s) 11 as described with respect to FIG. 1. Certain embodiments of the display 21 can include a curtain driver element 262 and/or a positional display element supporting region 264. A number of the positional display element(s) can be maintained within the positional display element supporting region 264. The curtain driver element 262 can maintain a curtain in the positional display element supporting region 264 that is sufficient to support and/or suspend the positional display element(s) 264. Each of the positional display element(s) as described with respect to FIG. 2 can be supported in the positional display element supporting region 264 using an air, gaseous, liquid, or other fluid media that can form a curtain. In certain embodiments, the air, gaseous, fluid, or liquid media forming the fluid curtain can be clear, translucent, opaque, etc. to allow at least some of the light generated by the positional display element to be displayed on the display 21. The curtain supporting the positional display element(s) can be arranged to distribute the positional display element(s) 11 with respect to the display along one, two, or three dimensions, as described with respect to FIGS. 1, 2, 3, 4, etc. A variety of embodiments of a curtain driver element as described with respect to FIG. 2 can be provided to create a curtain that can support the positional display element(s) 11. Certain embodiment(s) of the curtain driver element 262 can include, for example, a blower, pump, or compressor of the fluid. Certain embodiments of the curtain driver element 262 can drive the fluid in an axial, vertical, or other direction in a manner that can support the positional display element(s). The viscosity of the fluid included in the curtain can be selected such that in certain embodiments, the positional display element(s) can flow freely within the fluid, and can be displaced frequently. In other embodiments, the viscosity of the fluid included in the curtain is much thicker, such that the positional display element(s) have a tendency to remain largely in the same position or be displaced quite slowly. Certain embodiments of the positional display element supporting region 264 can also be naturally occurring, such as by situating the at least one positional display element(s) in a stream, lake, river, the atmosphere, outer space, the air, etc. For example, certain embodiments of positional display element(s) can be configured to float on, be suspended in, or sink in naturally occurring fluids (or lack thereof) such as a lake, a river, the atmosphere, a pool, a vent, outer space, etc.

In certain embodiments of the display 21 as described with respect to FIG. 2, certain ones of the positional display element(s) can be "actuated" or "de-actuated" to be made more visible than other positional display element(s). For example, in FIG. 2, the darker positional display element(s) can controllably be made to stand out, or blend in, with other positional display element(s) on the display as a result of their color, intensity, reflectivity, or other optical characteristics. One technique can involve certain positional display element(s) being made darker, and therefore more visible, than other lighter positional display element(s). For example, certain positional display element(s) 11 can be made a different color or optical characteristic, and in such changing of the color or other optical characteristics of at least certain ones of the at least one positional display element(s) can occur, for example, by changing color, contour, reflectivity, opaqueness, and/or other optical characteristics of the positional display element(s). Changing color or optical characteristics displayed or illustrated by the at least one positional display element(s) can be utilized to affect the visual presentation such as to produce an image, document, or other such displayed object using the display. Such displaying of at least a portion of the image by the at least one positional display element can represent a goal of the positional display element with respect to the display 21. Such change in the optical characteristics of the positional display element(s) can occur as a result of the positioning of the positional display element(s).

As a result, certain positional display element(s) 11 that are positioned at certain positions relative to the display 21 (or using another display coordinate system), will be displayed as being relatively dark as described with respect to FIG. 2, while the positional display element(s) that are situated at different positions will be displayed as being relatively light. A simple shape, such as may be used to generate writing, is shown for ease of illustration in FIGS. 2 and 3. The simple shape is used to demonstrate that more complex shapes could be established using the techniques as described herein. As the dimensions of the positional display element(s) increase and their density increases, the complexity, sharpness, and resolution of the display will improve accordingly. The particular pattern, shape, contour, writing, image, object, or display that is being displayed can vary as desired. In effect, each positional display element(s) 11 included in the display 21 will be actuated or de-actuated depending on whether it can be used to affect the visual presentation, such as by displaying an image, etc. The embodiment of the positional display element(s) 11, as described with respect to FIG. 2, can thereby be configured to provide an effective three-dimensional display.

The particular dimensions, shape, components, colors, optical characteristics, etc. of the positional display element(s) as described with respect to FIG. 2 is intended be illustrative in nature and not limiting in scope. As such, it is envisioned that a different device density of positional display element(s) and/or different size of the positional display element(s) may be included in the display 21. For example, if it is desired to provide the display with a greater resolution, than the number of the positional display element(s) may be increased and/or their effective light-generating dimensions may be decreased. For use by viewers who are viewing closer to the display, the dimensions of the positional display element(s) can be reduced and/or their number or density along one, two or three dimensions can be increased.

In certain instances, it may be desirable to alter (e.g., increase or decrease) the viscosity of the fluid supporting or suspending the positional display element(s) such that the positional display element(s) do not move as frequently, and a rate of change of the position of the at least one positional display element(s) can generally be changed. By changing or controlling the viscosity of the fluid, the resultant image can be defined with different clarity, with different operating speeds, and/or with different resolution. Such increasing the viscosity of the fluid can take a variety of forms taking, but not limited to, selecting a more viscous or thicker fluid (e.g., oil), cooling the fluid to make it more thick, adding a solid or other material to the liquid, etc. In certain embodiments, the at least one positional display element(s) can even be positioned at least partially on, in, or under a drying material such as a resin, such that once the relative position of the at least one positional display element(s) within the display 21 are determined, the position can be maintained with a high degree of certainty.

Though FIG. 2 illustrates a three-dimensional display supported in the positional display element supporting region 264 by the curtain established by the curtain driver element 262. It is envisioned that such concepts can also be used to produce a two-dimensional or one-dimensional display. For example, the blower can be of a lower power, and thereby the positional display element(s) can be maintained at a substantially single level which is considered as the level that the positional display element(s) will drop to as the power of the curtain driver element 262 is reduced (or the curtain driver element 262 can be not utilized in certain embodiments). Therefore, reducing the power of the blower can reduce a height dimension of the three-dimension curtain, which can result in altering the affected visual presentation. In certain embodiments, for example, reducing the height dimension (or other dimension) of the curtain can effectively convert a three-dimensional display to a two-dimensional display. Additionally, in certain embodiments, a two-dimensional curtain can be provided by affecting the visual presentation in which the positional display element(s) are constrained to follow a two-dimensional element, such as a plate that the positional display element(s) can be supported by, contained within, attached to, attracted to, secured to, etc.

In certain instances where a number of positional display element(s) 11 are being displaced within the display 21, as described with respect to FIG. 2, those positional display element(s) that are actuated but move out of an actuated region will become de-actuated. Additionally, those positional display element(s) that are de-actuated, but move on to an actuated region will become actuated. As such, the particular positional display element(s) that are being used by the display 21 to create a particular image may change.

Additionally, certain embodiments of the positional display element may allow modification of an image. If the at least one positional display element(s) 11 move, then different ones of the positional display element(s) may have to be actuated or de-actuated to affect a similar visual presentation. Also, if the shape, content, writing, appearance, color, etc. of the display 21 changes, then a different set of positional display element(s) may have to be actuated are de-actuated to reflect the new visual presentation is being affected by the display.

FIG. 3 shows another embodiment of the display 21 in which the positional display element, instead of being supported by the fluid curtain as described with respect to the embodiment of FIG. 2, are instead supported by a solid media or a fluid media, which in many embodiments may be highly viscous. For example, the positional display element(s) 11 as described with respect to FIG. 3 can be mounted in a thick clear or opaque resin, glass, fluid, liquid, solid, or other material by which the position of each of the positional display element(s) 11 may not change position (the positional display elements may not move). To affect the visual presentation using the embodiment of the display 21 as described with respect to FIG. 3, those positional display element(s) that are maintained situated at a desired position (such as by using a resin, or other positional display element securing mechanism) to create an image, a figure, writing, etc. would be actuated (or de-actuated) to be made more visible as described in this disclosure.

Although the positional display element(s) as described with respect to FIGS. 2 and 3 are illustrated as being monochromatic, since they can change to only one other color (between black and white) to become more visible. In other embodiments the positional display element(s) may alternatively be multi-chromatic or color, and therefore can change more than one color. For example, in certain embodiments, certain positional display elements can change red, while others can change green, and/or yet other positional display element(s) can become blue to create a color display. In other multi-chromatic embodiments, certain positional display element(s) can be actuated (or de-actuated) to change to a single color such as red, while other positional display element(s) can be actuated to change to another color such as blue or green, etc. as such, a variety of embodiments of multi-chromatic displays can represent visual presentations to be affected. As such, each color ranging from white to black can be generated in certain embodiments of the display.

Figure 4:
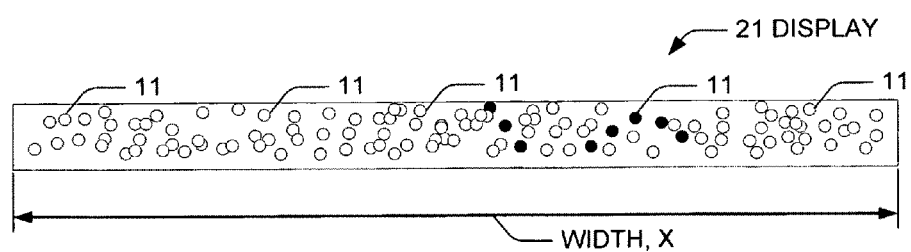
FIG. 4 is a diagram of another embodiment of the display, arranged in one dimension, including the at least one positional display element.

Similarly, certain embodiments of one-dimensional curtains (that may appear as wands) can be provided using a clear one-dimensional element that the at least one positional display element(s) can be contained within, supported by, attached to, secured within, etc. similarly as described with respect to FIG. 4. While the embodiment of the display 21 as described with respect to FIG. 4 can be described as one-dimensional since it has a considerable length and is quite narrow, in actuality it may be considered as two-dimensional and/or even three-dimensional since it does have some width dimension and/or height dimension. Depending upon operational characteristics such as actuation/de-actuation speed of the positional display element(s) 11, visual changes may change in certain embodiments of the display 21 relatively quickly. As such, as the display 21 travels through a position, it can affect the visual presentation by having certain ones of the positional display element(s) become actuated or de-actuated. For one-dimensional or two-dimensional displays 21 having extremely quick-acting positional display element(s), for example, the displays can move through the area extremely quickly similar to a fan-blade moving across space, and the positional display element(s) can be similarly quickly actuated and/or de-actuated to affect the visual presentation.

Provided that the appearance of the positional display element(s) can vary depending upon its current position, such moving a display across an area quickly will result in display larger image corresponding roughly to the area which the display is being moved across, compared to the original dimension of the display. For example, moving one embodiment of the display 21 that configured as a wand of a length X as illustrated in FIG. 4 across a distance D (assuming that D is substantially perpendicular to X) could result in a display covering an area approximately equal to D multiplied by X. Similarly, a one or two-dimensional display rotating sufficiently quickly around a hub in a manner similar to a ceiling fan to produce different embodiments of a display having a circular area substantially equal to a periphery defined substantially by within where the display moves.

Figure 5:
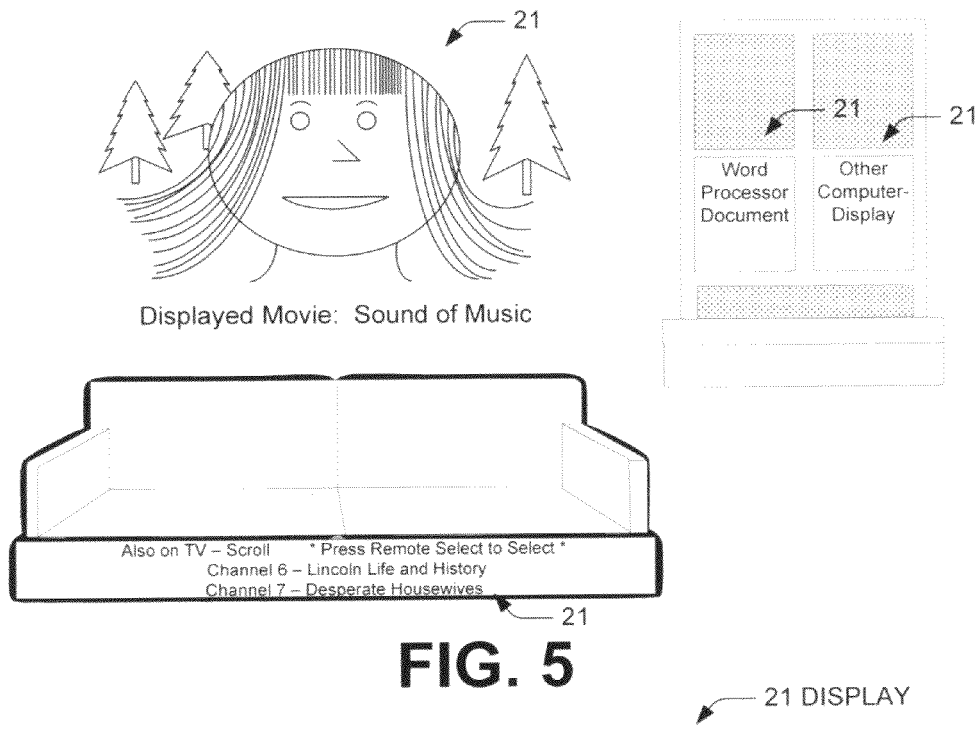
FIG. 5 is a diagram of yet another embodiment of a number of displays arranged in a room, including the at least one positional display element.

FIG. 5 shows another embodiment of the positional display element(s) that can be secured to a variety of substrates such as a wall, a fabric portion, or a window, etc. to provide the display 21. A number of displays 21 are described with respect to FIG. 5 to indicate that a variety of embodiments of the display can be situated at different positions, situated on or attached to different materials, etc. Certain embodiments of the displays may be related while others may not be. The dimensions of the positional display element(s) can vary considerably in size, granularity, dimensions and/or uniformity of positional display element(s), and/or a variety of other factors. For instance, the display 21 situated on the wall of FIG. 5 can be used as any suitable display including but not limited to a theater system, a computer display system, a television system, a video system, a gaming system, etc. It is envisioned that certain embodiments of the display 21, as described with regards to FIG. 5, can be applied to a home, an office, a commercial place, a business, a restaurant or bar, or anywhere in which it may be desired to position the display 21.

Certain embodiments of the positional display element(s) 11 as described with respect to the display 21 of FIG. 5 can be secured to a substrate such as a wall, fabric, mesh, a billboard, etc. For instance, the positional display element(s) 11 forming the display situated on the wall can be attached, pasted, painted, fabricated, adhered to, tiled, or otherwise secured to a wall, etc. As such, in certain embodiments, the thickness of the display positional display element(s) can equate to the thickness of the individual positional display element(s) plus any substrate or adhesives used to secure the positional display element(s). Although certain ones of the display 21, as described in this disclosure are illustrated as being rectangular, it is envisioned that any form, size, or shape of display can be provided. The dimension of the display 21 can reflect the area that positional display element(s) are attached, maintained within, displaced within, or otherwise supported by. As such, additional positional display element(s) 11 can also be attached to an existing positional display element to thereby increase the effective dimension, resolution, operating characteristics, etc. of the display 21.

In certain embodiments, a window display can also be provided where a name appears. Consider that a scene or light from an external window can be provided to a display at an entirely different position. For example, a seascape can be displayed (in real-time or other) as one embodiment of affecting the presentation, that can be displayed, e.g., far from the ocean or the tall-building that the view originated to another remote location. As such, certain embodiments of displays can include positional display element(s) that can display a real-time, other landscape, or other scene even at locations remote from where the presentation originated.

It would be possible, for example, to attach the positional display element(s) to an entire wall, or any suitable portion thereof, included in a house, building, office, dwelling, billboard, external wall, etc. to effectively turn the region into the display. In certain embodiments, the de-actuated or actuated positional display element(s) can be configured to be clear, opaque, or of the color of the background to appear hidden to the background. As such, when an image or other information is not being displayed on the display 21, certain embodiments of the display may appear hidden in the background such as the wall or other surface. In certain embodiments, a computer-based display could illustrate a painting or a poster on a wall, surface, billboard, etc. As such, in certain embodiments, the particular display or painting being displayed can be changed or modified as desired by the owner, user, and/or operator of the display.

Also described with respect to FIG. 5 is an embodiment of the display 21 that can be situated on the material (fabric or overlay) of the couch. To create such a display, at least one positional display element(s) may be attached, secured, affixed, or otherwise positioned relative to the fabric, material, mesh, etc. forming at least a portion of the couch. Certain embodiments of the display 21 can similarly be provided on furniture, tables, desks, drapes, flags, screens, meshes, and other items. As such, the objects and/or fluids which certain embodiments of the positional display element(s) can be attached and/or suspended, to affect the visual presentation, are truly limited only by the imagination of the user, the designer, and/or the operating characteristics of the positional display element(s).

Certain embodiments of the display 21 can be associated to other displays. For example, the illustrated display situated on the fabric of the couch shown in FIG. 5 can provide a secondary display that is associated with the primary display such as illustrated on the wall. For example, the secondary display of FIG. 5 that is situated on the fabric of the couch can display a channel or movie guide, or alternatively a channel or movie selector of the respective channel or movie that is to appear on the primary display such as being displayed on the wall in FIG. 5. In another embodiment, for example, a secondary channel or movie guide/selector can appear on a wall position next to the primary display on the same wall.

Certain embodiments of the display 21 can also be situated on, between, behind, or otherwise relative to windows made of glass, plexiglas, or another material. For example, the positional display element(s) can be affixed to or adhered to the glass of the window such as described with respect to FIG. 5. In one embodiment, the positional display element, when deactuated, can be clear, opaque, or translucent to permit light to pass therethrough to act as the window when it is desired to not use the display. In certain embodiments, the color of certain embodiments of the displays situated on or in windows can be selected to improve viewing capabilities, appearance, etc. Though the display on the window illustrated with respect to FIG. 5 includes a computer display, any other type of computer-based display such as a TV, movie, static or moving painting, static or moving image, or other display could also be included.

Another embodiment of display including positional display element(s) 11 can display a meeting, lecture, classroom, or other situation. As such, certain embodiments of displays including the positional display element(s) 11 can be situated to display remote meetings, such that the individuals will not have to travel to the remote position. With many embodiments of such business, educational, or other displays, travel expenses can be considerably reduced.

Figure 6:
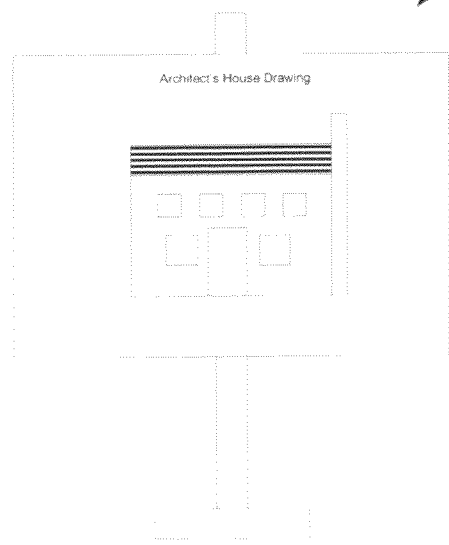
FIG. 6 is a diagram of another embodiment of the display, supported on a stand.

Another embodiment of the display 21 can include the positional display element(s) 11 being attached to or laid upon a desk, table, piece of furniture, piece of cloth, vehicle, etc. FIG. 5, for example, illustrates a variety of distinct embodiments of the display 21 being attached to a wall surface, a piece of fabric or furniture such as at least a portion of a couch, and/or a window, etc. FIG. 6, for example, illustrates the positional display element(s) attached to a board supported by a stand (e.g., an architect's stand). There can be a wide variety of configurations of tables, desks, stands, furniture, etc. that can provide a variety of embodiments of the display.

Figure 9:
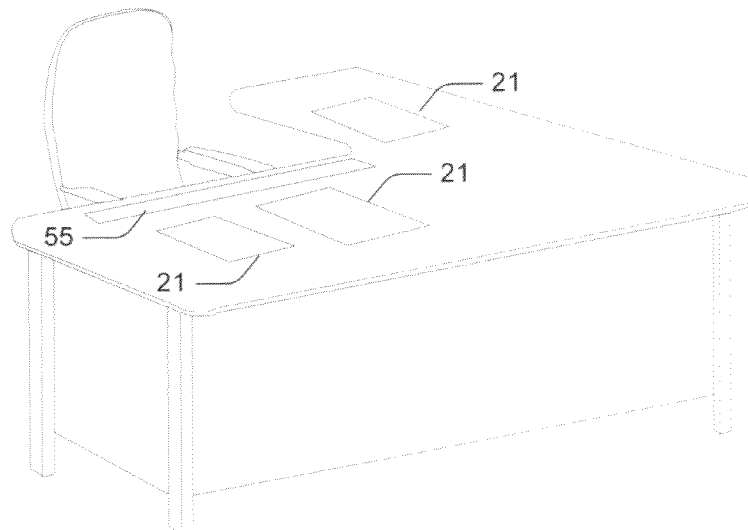
FIG. 9 is a diagram of another embodiment of the display situated on an upper surface of a desk, including the at least one positional display element.

FIG. 9, for example, illustrates the positional display element(s) attached to or deposited on an upper surface of a desk as described herein such as could be used to provide the functionality of a computer display or monitor to the upper surface of the desk. In certain embodiments, the positional display element(s) of the display can be actuated using an input device 55 such as a keyboard, mouse, computer-pen, such as is known with input devices for computers such as desktop computers, laptop computers, and/or tablet PCs. The input device 55 such as the keyboard and/or mouse could be configured to transmit display information in a wireless configuration with the positional display element(s) (attached to the upper surface of the desk, for example). As such, display information such as word processing, number computing, database processing or modification, etc. could be displayed at a desired position on the display, as another example of affecting the visual presentation. Certain embodiments of the desk display 21, as described with respect to FIG. 9, can reduce the number of papers, books, manuals, computers, etc. that are often situated on many desks. It would be desirable to fabricate, or coat, the positional display element(s) 11 that are situated on such a high-use area as a desk (or a floor) with a suitable material to resist wear and/or abrasion.

One embodiment of the display 21 including a regular configuration of the at least one positional display element(s) 11 is described with respect to FIG. 7. Such a regular configuration of the at least one positional display element(s) can be fabricated using semiconductor processing techniques similar in many aspects to the techniques used to fabricate LEDs, LCDs, and/or other light or photonic generating devices. In addition to the light generating portion, each of the positional display element(s) can be associated with the controller portion 19 and/or the computer controller 18. As such, certain embodiments of the controller portion 19 and/or the computer controller 18 as described with respect to FIG. 10 can control multiple ones of the at least one positional display element(s).

Figure 8:
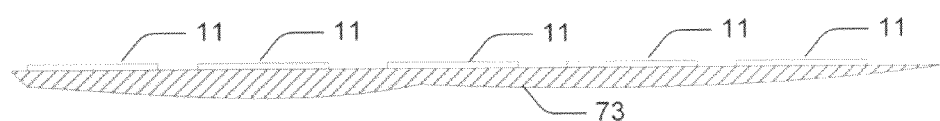
FIG. 8 is a diagram of an embodiment of the at least one positional display element(s) secured to a substrate.

Certain embodiments of the at least one positional display element(s) 11 can be situated as discrete elements on a substrate 73, similar to as described with respect to FIG. 8. The substrate 73 can be, in different illustrative but not limiting embodiments, made from: paper, wood, metal, a portion of a wall, a portion of a floor, the ground, a piece of furniture, a fabric, etc. In different embodiments, spacing between the at least one positional display element(s) can be uniform or varied along one dimension, two dimensions, or three dimensions.

As such, a variety devices can be utilized to determine positions of different embodiments of the at least one positional display element(s) 11. By determining the position of the at least one positional display element(s) 11, it can be determined what should be displayed thereupon to affect at least a portion of the presentation for the display 21. Since there are a considerable variety of materials, substrates, fluid curtains, liquids having different viscosity, etc. that can support the at least one positional display element(s), it is to be understood that the positional display element can often be expected to move at different rates depending upon how they are supported. As such, the controller portion 19 of the positional display element 11, or alternatively the computer/controller 18 as described with respect to FIG. 10, should be adaptable depending upon the likely rate of movement of the particular positional display element 11.

One embodiment of the display 21 is situated on a desk 921 is described with respect to FIG. 9. As such, in certain embodiments the entire upper surface of the desk can be considered as the display which can operate in a similar manner as a computer display or monitor, such as those that can be configured to display computer-based windows within the display. It is envisioned, for example, that at least a portion of a surface (e.g., upper surface) of the table or desk 921 may include the number of positional display element(s) attached thereto or positioned thereupon to form the display. Therefore at least the portion of the surface of the table or desk (or in other embodiments other positions such as wall) may in actuality be configured to act as a computer graphical user interface (GUI) as described with respect to FIG. 9. In certain embodiments, a region of a wall or other structure behind the desk 921 or table could be coated or covered with the at lest one positional display element(s), such as to be viewable by a user sitting at the desk or table. In certain embodiments, the display 21 can be configured as a graphical user interface (GUI) may be included in the display. For instance, an input device 923, similar in operation to a keyboard, mouse, stylus, etc. can be provided to input data to the display 21. As such, certain embodiments of the computer-based display 21 can be modified by user input in a similar manner as a computer monitor or display. The dimensions of the positional display element(s) should be configured based on viewability, resolution, viewer location, and other ergonomic or other aspects. In certain embodiments, the embodiments of the display 21 configured as the GUI or other computer-based display can be controlled, for example, using a standard computer operating system, such as Microsoft Windows, UNIX, and/or other operating systems which are commercially available. In many instances, the displays configured as "documents" situated on the desktop can be moved across the desktop as desired, as with window-based computer displays.

The selection of a particular operating system to associate with each suitable computer-based embodiment of the display 21 may depend, at least in part, on for what that particular display is being used. For example, a particular desktop or tabletop that can be coated with positional display element(s) may be used to compose letters and/or perform other computer type operations, while a particular wall position that is coated with positional display element(s) may be used to show movies, slide-shows, or television. Since the users or installers of the display can situate the positional display element(s) forming the display on any desired suitable position or fluid curtain, it is likely that many objects may become, and/or include a display by attaching a display thereto. Certain users may select to use the positional display elements of the computer-based display that could be mounted on a device or stand that could sit on top of the desk; such as to appear more similar to a computer monitor, etc. Since the positional display element(s) represent the active components of a number of the display(s), the dimensions of the display can be selected based on the physical dimensions of the positional display element(s). As such, many embodiments of the displays can be designed to be thin, cover a large one, two or three-dimensional area, and in many instances may be quite light.

The displays 21 that are illustrated as being situated on top of the desk in the FIG. 9 may be easily moved about, modified, open, closed, page-changed, saved, etc. in a manner known to graphical user interface (GUI) users or computer users. As such, each display 21 that is positioned on the desk in FIG. 9 could represent data equal to a large book, manual, reference, etc. in which the content of each page can be easily modified using known GUI techniques. Such an embodiment of the displays situated on the desk can lead to reduced clutter on many desks by allowing electronic documents to be viewed, positioned, and edited on the physical desktop in a similar manner as paper documents, and allowing removal of the paper document(s), book(s), manual(s), etc.

As the user of certain embodiments of the display 21 which can be computer-based, similar to as described with respect to FIG. 9. As such, the display can show input display information such as inputting a letter in a word processor program, inputting data or running a query into a spreadsheet or database program, drawing a line in a drafting or other program, typing a letter, etc. The display can thereupon display the information, data, etc. at a desired position on the desk-top display. Such input of the display information could alter the display, or its optical characteristics, accordingly. As such, the optical characteristics of certain ones of the positional display element could be changed depending upon their position, and whether that position corresponds to regions that the optical characteristics are indicated as being altered.

While certain embodiments of the display can project a movie, TV show, or other moving images, it is also envisioned that certain embodiments of the display can provide a still image. Consider, for example, the movie or TV show described as being shown on the wall in FIG. 5. It may similarly be desired to provide a painting, or other static image, on the wall. In another embodiment, the color of the wall or room could be changed by altering the optical characteristics output by the positional display element(s) 11 of the particular display 21. In certain embodiments, a room could be converted from a light, airy color with a first set of paintings or posters at one time of day to a darker color with another set of paintings or poster at another time. An entire purpose and/or character of a room could be altered almost instantaneously by changing the color, paintings, posters, etc. of the display. Selecting or modifying the color, etc. of the display covering the wall could therefore be considered as one embodiment of the affecting the visual presentation.

Certain embodiments of the positional display element(s) may be attached to a shirt or other piece of clothing, a tattoo, or a piece of jewelry or a watch. As such, the clothing, tattoos, or jewelry, etc. can be configured to change color or appearance as desired, or even be configured to affect the visual presentation such as displaying a message that can be modified according to the operation of the positional display element(s).

Certain embodiments of the positional display element(s) can also be configured to be operated outdoors. Such positional display element(s) should be configured to be able to withstand the particular operating characteristics (rain, snow, temperature variation, moisture, etc) that they are likely to encounter, depending largely on the duration that they are likely to be operating.

The positional display element(s), as described in this disclosure, can thereby perform a variety of display operations that can be used in a variety of scenarios. Certain embodiments of the positional display element(s) as described with respect to FIGS. 10 to 12 and throughout the remainder of this disclosure (and the control thereof such as provided by the computer/controller 18), are therefore intended to be illustrative in nature and not limiting in scope.

II. Examples of Positional Display Element(S) Configuration

This portion of the disclosure describes a variety of embodiments of the positional display element(s) 11 that are configured in many embodiments to act as the display 21. It is also envisioned that certain embodiments of the display can generate other non-display features that can include but are not limited to sound, voice, temperature (heat and/or cool), visible gasses for appearance or effects, vibrations, etc. Certain embodiments of the positional display element(s) 11, as described with respect to FIG. 10, can therefore include, but are not limited to, a communication portion 13, a display portion 15, a power converter portion 17, a power source 25, and a controller portion 19. In certain embodiments, the communication portion 13 can be configured to provide communications of display signals and/or transfer display data with other positional display element(s) 11 and/or the computer/controller 18 to allow the discrete positional display element(s) to act as a unitary display using networking techniques and/or systems. As such, the positional display element(s) can affect a non-visual presentation in addition to affecting the visual presentation. In certain embodiments, the communication portion 13 can include an antenna 12 that may operate (send or receive electromagnetic radiation) at radio frequencies, optical frequencies, infrared frequencies, etc. that can be configured to provide a wireless link between the positional display element(s) and other positional display element(s) or computer/controllers 18, etc. In certain embodiments, the antenna 12 can thereby provide a transmission of electromagnetic radiation (configured as signals and/or information) to other positional display element(s) 11, the computer/controller 18, and/or other device(s).

Certain embodiments of the positional display element(s) 11 can be configured to affect the visual presentation by, for example depending upon context, emitting light. A variety of such parameters that can be displayed are described with respect to the various devices as described with respect to FIGS. 10, 11, and 12. These parameters to be displayed, as well as the circuitry, software, hardware, and/or firmware of the positional display element(s) to determine what to display, are intended the illustrative in nature and not limiting in scope. It is envisioned that the rate at which each of these individual parameters are displayed may be controlled depending upon the particular configuration and/or operating set-up of the positional display element(s) 11. Operating the positional display element(s) can include, but is not limited to: affecting the visual presentation for the positional display element(s) 11, controlling input to the positional display element(s), etc. In certain embodiments, the positional display element(s) displaying rate of any or each of the displayed parameters can be controlled by the computer/controller 18.

In certain embodiments, the computer/controller can control the general display operation of display information (e.g., data, signals, etc.) by the positional display element(s) 11. Certain embodiments of the computer/controller can be referred to herein and in general industry as a "base station" among those skilled in networking technologies.

Certain embodiments of the controller portion 19 can include, but is not limited to: a processor 605, a memory 607, a circuit 609, and an input/output (I/O) 611. The controller portion 19 in general, as well as its component, can rely on computing architecture and technologies, such as utilized by a microprocessor or microchip. FIG. 10 also illustrates the computer/controller 18 that can include similarly referenced components: 605, 607, 609, and 611, since this also is a computer-based device. The positional display element(s) 11, as well as the device(s) 18 can each be provided with similar components having similar component reference characters 605, 607, 609, and 611. The components 605, 607, 609, and 611 can rely on similar computer architecture as understood by those skilled in the computer and/or controller technology. Each positional display element(s) 11 or device(s) 18 can also rely on any combination of hardware, software, and/or firmware as is generally understood by those of ordinary skill in the computer and/or controller technologies. As such, any one of, or any combination of, the positional display element 11 or device(s) 18 can perform certain positional display elements.

Certain embodiments of the positional display element(s) 11 can, depending upon fabrication technique and/or design be configured to be quite small. Certain embodiments of the positional display element(s) 11 can measure less than an inch, or even a small fraction thereof. Therefore certain embodiments of the positional display element(s) can be distributed in relatively large numbers within an area to affect the visual presentation. Miniaturization and expansion of certain operational concepts and/or designs, similar to as developed with certain embodiments of optical systems, microprocessors, microcomputers, motes, and the like can be applied to certain embodiments of positional display element(s). Those embodiments of the displays 21 that are envisioned to be viewed closer to the user and/or for a longer duration may not generally include similar, more densely-packed positional display element(s) that may be capable of providing a higher resolution or crisper image. As such, certain embodiments of the positional display element(s) that do not move much or frequently can be configured to perform their displaying or operating functionality relatively unobtrusively by not requiring frequent position computations. Other embodiments of positional display element(s) 11 that undergo frequent or rapid movement may undergo considerable displaying or operating functionality. Additionally, many embodiments of the positional display element(s) can be powered by the power source 25 that in certain embodiments can include a relatively low-power device (such as a battery that can be rechargeable or replaceable, or a power cell). For many of the reasons described in this disclosure, maintaining a longevity of operation for the power source can become an important consideration for many embodiments of this disclosure.

In certain embodiments, the power converter portion 17 can convert the power received into a form that can be used to power to positional display element(s). For example, certain embodiments of the power converter portion 17 can include an energy source that receives energy from another source, such as a power converter portion or a solar panel, which in certain embodiments can be integrated in the power source 25 of the positional display element(s) 11. The energy received from the power converter portion 17 can be converted to one that can be used to power the positional display element(s) 11. In certain embodiments, the power converter portion 17 can be physically and/or operationally separated. In an alternate embodiment, energy contained in a received signal can be converted into frequency and/or form of energy that can be utilized by the positional display element(s) 11 for power purposes. These and other configurations of operations of the communication portion 13, the display portion 15, the power source 25, and the power converter portion 17, are provided as illustrated within this disclosure, and are not intended the limiting in scope.

Positioning certain embodiments of the positional display element(s) with considerable precision can be challenging, especially considering the relatively small dimensions, large numbers, imprecision of distribution, and varied applications of positional display element(s), etc. Certain embodiments of positional display element(s) can be positioned in a variety of dangerous and/or difficult for a human to reach, access, repair, configure, and/or replace, etc. positions. As such, it may be difficult to service such positional display element(s) such as by ensuring that they are operating properly, are properly configured, and are therefore capable of affecting a variety of visual presentations or performing a variety of operations.

Due to the relatively low potential cost of a variety of the individual positional display element(s) compared with a variety of discrete components, it is envisioned that certain embodiments of the positional display element(s) can be distributed in relatively large numbers such as to provide a gradient of displayed portions of images and/or provide a variety of related operations (such as within a relatively small area). As the technology of the positional display element improves (e.g., due to diminishing size, improving functionality, and/or improved semiconductor or other processing techniques); as the cost of the positional display elements are reduced, the usage of the positional display elements within the displays would become more commonplace or accepted. Many of the applications for the positional display element(s) can rely on a considerable amount of reliability from the power portion.

The computer/controller 18 can be configured using a variety of computers and/or controllers, platforms, technologies, and/or techniques. For instance, the computer can be implemented in positional display element(s), computer/controller, and/or other computer-based systems, as described with respect to FIG. 10. Many embodiments of the positional display element(s) can be configured to determine positions of the positional display element(s) 11, to control at least some visual presentation affecting operations by the positional display element(s) 11, and/or receive, store, or otherwise process at least some image information that can be displayed from the positional display element(s) 11 and/or the other device(s) 18. In certain embodiments, the computer/controller 18 can be configured as a standalone computer, a mote, a laptop computer, a desktop computer, a microprocessor, a microcomputer, a mainframe computer, and/or any other type of computer that can process data or other information relating to affecting the visual presentations such as provided by the positional display element(s) 11 and/or the other device(s) 18. The configuration of the computer/controller 18, as described with respect to FIG. 10, is intended to be illustrative in nature depending on the context and not limiting in scope; more detail relating to the positional display element(s) 11 or other device(s) 18 are provided in this disclosure.

FIGS. 11 and 12 each illustrate an embodiment of the positional display element(s) 11. FIG. 11 shows an example of the positional display element(s) 11 of the display network 10 that may serve as a context for introducing one or more processes and/or devices described herein. Certain embodiments of the positional display element(s) 11 can generally be configured to include displays, sensors, actuators, computational entities, and/or communications entities, depending upon their intended operation. The embodiment of the positional display element(s) 11 of FIGS. 11 and/or 12 is illustrated as including the antenna 12, physical layer 104, antenna entity 119, network layer 108 (shown for sake of example as an appropriate ad hoc routing application), display device entity 110, electrical/magnetic device entity 112, pressure device entity 114, temperature device entity 116, volume device entity 118, and inertial device entity 120. The particular entities 110, 112, 114, 116, 118, and 120, as well as the other components in these figures, are intended to be illustrative in nature and not limiting in scope. Those entities that are selected can determine those parameters that the positional display element(s) 11 can affect the visual presentation, as well as those operations that the positional display element(s) can perform. Additionally, the positional display element(s) 11 can be configured to provide a variety of operations and/or functions.

Many embodiments of the physical layer 104, as provided within the positional display element(s) 11, can provide for data transfer to/from a number of devices as described with respect to FIGS. 11 and/or 12, that allow for affect the visual presentation. Each of the respective display device entity 110, electrical/magnetic device entity 112, pressure device entity 114, temperature device entity 116, volume device entity 118, antenna entity 119, and inertial device entity 120, as depicted, can couple through physical layers 104 using the respective display 21, electrical/magnetic device 142, pressure device 144, temperature device 156, volume device 158, antenna 12, and inertial device 160. Those skilled in the art will appreciate that the herein described entities and/or devices are illustrative in nature and not limiting in scope, and that other entities and/or devices consistent with the teachings herein may be substituted and/or added.

Those skilled in the art will appreciate that herein the term "device," as used in the context of devices comprising or coupled to the positional display element(s) 11, is intended to represent but is not limited to transmitting devices and/or receiving devices dependent on context. In some exemplary contexts, the display 21 can be implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). As such, the display 21 can perform a variety of light-emitting or light-receiving operations, upon actuation, by which display information and/or display data can be displayed, and as such the visual presentation can be affected.

Certain embodiments of the positional display element(s) can actuate a variety of other devices which can affect one or more non-visual presentations in addition to those device(s) that are necessary to affect the visual presentation, such as produce light for the display. For example, audio, sound, speech, vibration, heat, and a variety of other non-visual presentation affects can be included in or actuated by certain embodiments of the positional display element(s) 11. A person watching a movie, for example, can experience high-quality audio or sound (another non-visual presentation) originating from a variety of positions around the area. In some exemplary implementations, the electrical/magnetic device 142 can be implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). An example of such a supporting device might be a "smell" producer or a vapor or gas producer, which in many instances could enhance the affected visual presentation. As such, a large variety of presenting affects are within the intended scope of the present disclosure. In some exemplary implementations, the pressure device 144 can be implemented, e.g., using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, the temperature device 156 can be implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, the volume device 158 can be implemented using one or more volume transmitters (e.g., gas/liquid transmission devices) and/or one or more volume receivers (e.g., gas/liquid reception devices) and/or one or more supporting devices (e.g., supporting hardware, firmware, and/or software). The examples of the devices that affect the non-visual presentation, as described in this disclosure, are intended to be illustrative in nature and non-limiting in scope.

In some exemplary implementations, an inertial device 160 can be implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture can be utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity, and are not intended to be limiting in scope.

Certain embodiments of the positional display element(s) can be configured to affect the visual presentation, such as to display the image such as the positional display element(s) 11 as described with respect to FIGS. 11 and/or 12. A variety of displays 21 that include the positional display element(s) can be configured to display a wide variety of parameters. Certain embodiments of the positional display element(s) 11 can be configured so that designer and/or user of the positional display element(s) 11 can determine or configure that display information or display data that the positional display element(s) will display. By comparison, certain embodiments of the positional display element(s) 11 can be reconfigured during normal operation. During reconfiguration, certain embodiments of the positional display element(s) 11 can be connected to or modified to the at least one display 21, such as providing a new hardware, software, firmware, etc. During reconfiguration, other embodiments of the positional display element(s) 11 can be reconfigured such that certain displays 21 that include the positional display element(s) can be actuated, such as by reconfiguring the hardware, software, firmware, etc.

FIG. 12, depicts an exploded view of two embodiments of the positional display element(s) 11, as described herein. The positional display element(s) 11 can form a part of a display network, in which the at least one positional display element(s) can communicate with other positional display element(s) and/or other devices. The positional display element(s) 11 as described with respect to FIG. 12 is illustrated as similar to the positional display element(s) 11 (e.g., described with respect to FIGS. 11 and 12), can include a log creation agent 202, a device-addressed display/control log 204, and device-addressed routing/spatial log 252.

Device-addressed display/control log 204, as described with respect to FIG. 12, as having illustrative entries of display information, electrical/magnetic device information, pressure device information, temperature device information, volume device information, inertial device information, and antenna information. Certain embodiments of the display information can correlate to a measure of the light that can be provided by the display 21 including the positional display element(s) 11, which can include brightness, saturation, intensity, color, reflectivity, transmissivity, hue, power (e.g., watts), flux (e.g., lumens), irradiance (e.g., Watts/cm$^2$), illuminance (lumens/m$^2$, lumens/ft$^2$), pixel information (e.g., numbers of pixels (e.g., a small image capture device), relative pixel orientation)), etc. Examples of electrical/magnetic device information include measures of field strength, flux, current, voltage, etc. Examples of pressure device information include measures of gas pressure, fluid pressure, radiation pressure, mechanical pressure, etc. Examples of temperature device information include measures of temperature such as Kelvin, Centigrade, and Fahrenheit, etc. Examples of inertial device information include measures of force, measures of acceleration, deceleration, etc. Examples of antenna information include measures of signal power, antenna element position, relative phase orientations of antenna elements, delay line configurations of antenna elements, beam directions, field of regard directions, antenna types (e.g., a variety of antenna types that can include but are not limited to horn, biconical, array, Yagi, log-periodic, etc.

In the implementation, as described with respect to FIG. 12, certain embodiments of a log creation agent 202 can be a computer program, that can be resident in the positional display element(s) 11, that executes on a processor of the positional display element(s) 11 and that constructs and/or stores device-addressed display/control log 204, and/or device-addressed routing/spatial log 252 in memory of the positional display element(s) 11. In some implementations, log creation agent 202 can be pre-installed on the positional display element(s) 11 approximately when the positional display element(s) 11 are added to the display network. In other embodiments, the log creation agent 202 can crawl and/or is transmitted to the positional display element(s) 11 from another position (e.g., a log creation agent at another positional display element(s) or another networked computer (not shown) to thereby replicate or clone itself, and transmits that log clone to the positional display element(s) 11). In yet other implementations, the log creation agent 202 can be installed at a proxy (not shown) for the positional display element(s) 11.

The structure and operation of each positional display element(s) 11, as described with respect to FIGS. 1, 2, 3, and/or 4 are intended to be illustrative in nature, and represents a number of illustrative embodiments of the positional display element(s) structure and operation. Certain embodiments of the positional display element(s) 11 continue to undergo development, and it is to be understood that other positional display element(s) 11 structures and operations (such as described in the articles, publications, and research as described herein) are also intended to be within the scope of the present disclosure as long as such positional display element(s) structures and operations satisfy the claim limitations of the present application, as interpreted based on the present disclosure.

In certain embodiments of this disclosure, the systems and/or processes transfer their display information (which may take the form of instructions, data, etc.) in a piecewise fashion over time. In some applications, the positional display element(s) 11 can be considered as relatively low-power and/or low bandwidth devices, and thus in certain implementations the system(s) and process(es) described herein allow some duration (e.g., minutes, hours, days, or even weeks) for herein described agents and/or processes to migrate to and establish themselves at various positional display element(s) 11. The same can be true for transmission of display information among the positional display element(s) 11 in that in some implementations such transmission may be done over the course of minutes, hours, days, or even weeks depending upon bandwidth, power, and/or other constraints. In other implementations, the migrations and/or transmissions are accomplished more rapidly, and in some cases may be accomplished as rapidly as possible.

Certain embodiments of the positional display element(s) 11 comprise logic 108. Certain embodiments of the logic 108 (which may be integrated using software, hardware, and/or firmware, and also may be installed within a memory) may be applied to cause the at least one positional display element(s) 11 to facilitate acts described herein.

Figure 15:
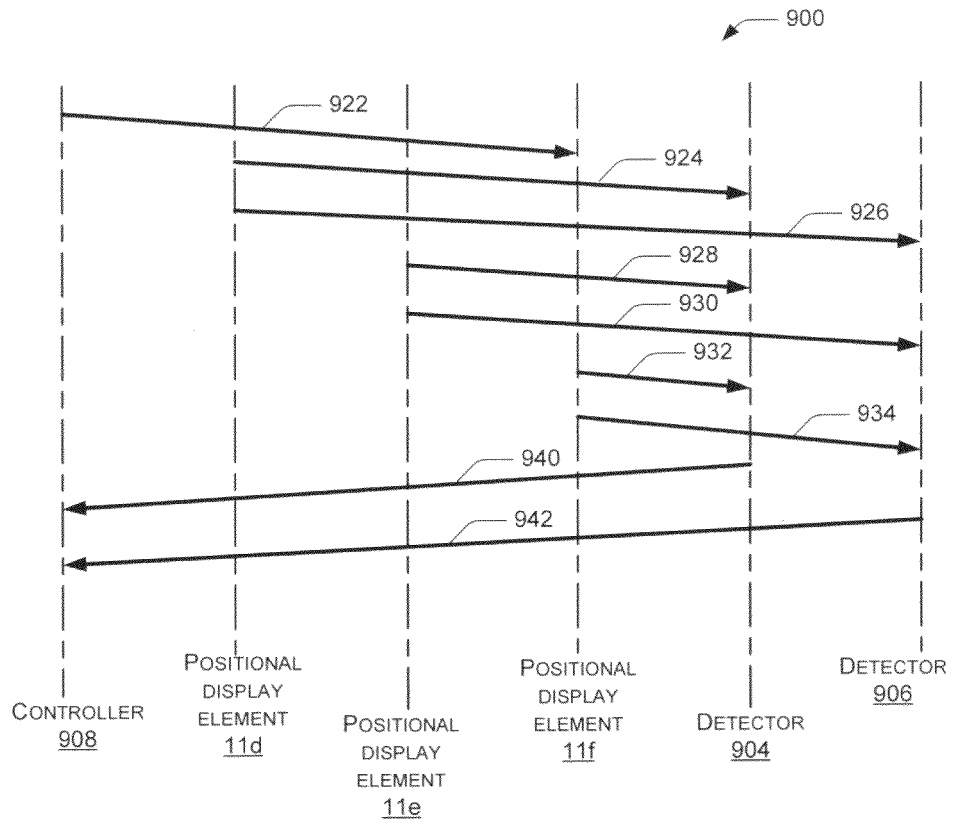
FIG. 15 is a signal diagram of signals transmitted between the at least one positional display element and other devices.

FIG. 15 shows a flow diagram of one illustrative (but non-limiting) embodiment of a process of determining positions of the at least one positional display element(s) 11, and one illustrative embodiment of the signaling that can be associated therewith. Other embodiments, which are within the scope of the appended claims can be considered as within the scope of the present disclosure. In one embodiment, the controller 908 as described with respect to FIG. 15 may generate a signal 922 that indicates an attempt to position the at least one positional display element(s) 11. With signal 922, the controller 908 as described with respect to FIG. 10 (which may be integrated within the positional display element 11, another positional display element, and/or one or more computers/controller 18 such as the base station) can provide a signal to the at least one positional display element(s) 11. In some cases, the signal 922 may be provided to those mote device(s) 11 that are positioned closest to the controller, or to the at least one positional display element(s) 11 that are specifically enabled to recognize the controller signal. Other scenarios of signaling selected or unselected mote device(s) may also be utilized. In some implementations, the controller 908 may in fact form a part of the network signaled, or alternatively may be remote from the network.

Certain embodiments of the at least one positional display element(s) 11 (e.g., 11d, 11e, 11f, etc.) that receive the signal 922 can thereupon respond with position information, such as by transmitting data that can indicate their relative position within the network, relative to the display 21, their geographic positions; or alternatively activating a light-emitting device at their present position that can be detected to position the at least one positional display element(s) 11. Certain embodiments of the response(s) (e.g., 924, 926, 928, 930, 932, and/or 934) may be recorded or detected by various detectors at different positions. For example, certain embodiments of the respective response(s) 924, 926 that can be generated by the respective at least one positional display element(s) 11d, 11e may be recorded by respective detectors 904, 906. Additionally, certain embodiments of the respective response(s) 928, 930 as generated by the respective at least one positional display element(s) 11d, 11e may be recorded by respective detectors 904, 906. Also, the certain embodiments of the respective response(s) 932, 934 as generated by the respective at least one positional display element(s) 11e, 11f may be recorded by the respective detectors 904, 906. The respective detectors 904 and 906 can thereupon receive the responses to the controller 908 using the signals as described with respect to FIG. 15

Certain embodiments of the respective detectors 904 and 906 may provide respective recorded responses 940, 942 (that pertain to the positional display element(s)) that are to be received by the controller 908. In certain embodiments, as described above, the controller 908 may be included alternatively in the positional display element 11, and/or the computer/controller 18 as described with respect to FIG. 10. In certain embodiments, the controller 908 may then thereupon process the recorded responses 940, 942 into graphical indications of positional display element position and/or layout.

III. Examples of Determining Positional Display Element(S) Position

For a positional display element to determine what color or intensity of light it should generate (and/or cause to be generated) to affect the visual presentation, it initially has to be determined where the positional display element (and the generated light) is positioned. Similarly, a picture element (pixel) on a traditional display will generate light of a particular color or intensity based on its position across the traditional monitor. This portion of the disclosure describes communications between multiple positional display element(s) and/or other devices such as can utilize signaling, as described herein.

Certain embodiments of the positional display element(s) 11 can further comprise a communication interface 106 to provide communications with other positional display element(s), controllers, computers, or devices. The positional display element(s) 11 may employ certain embodiments of the communication interface to communicate with other positional display element(s) 11 and/or other devices. Communication between different positional display element(s) 11 may be accomplished in certain embodiments at least partially wirelessly utilizing electromagnetic radiation at, e.g., a radio frequency, a light frequency, an acoustic frequency, or by other wireless and/or wired-based communication mechanisms known in the art. In other embodiments, at least a portion of the communication interface 106 can include a wired portion. As such, communications can be provided using wireless communications, wired communications, and/or a combination thereof.

Positional display element(s) 11 may further comprises an actuator/display (not shown). As such, each positional display element(s) 11 can include none, one, or more actuator(s), as well as none, one, or more sensor(s). Certain embodiments of the actuator/display may thereby affect a presentation and/or or affect the visual presentation. Not all embodiments will include these additional features to affect the presentation, but they may be present in others.

A variety of device(s) (not shown) can be operationally associated with and that may interact with the at least one positional display element(s) 11. The device may include, for example, a controller device, a wireless device, a communication device, a testing device, a monitoring device, a sensing devices, or a computer device (configured as, for example, a personal computer, a laptop computer, a desktop computer, a handheld computing device), one wireless device such as a digital assistant or a phone, an industrial device, or test equipment, to name just some of the possibilities. The device can include, e.g., logic such as is known to facilitate activities described within this disclosure. Certain embodiments of the system can include, for example: displays 21 that can be situated at a variety of different positions to, for example, display images.

It is envisioned that the embodiments of the positional display element(s) 11 can vary considerably in size, but many are intended be relatively small, such as of less than an 1 inch across, and sometimes a fraction of that. Due to the relatively small size of many embodiments of the positional display element(s) 11, a relatively large number of positional display element(s) 11 may be distributed across or within an area and/or volume. The particular dimension(s), configuration(s), and/or operability(s) of the positional display element(s) 11 can be selected and/or designed for based largely on where a typical or particular viewer would be situated with respect to the display. Due to the autonomy of potential operations between different ones of multiple embodiments of positional display element(s) 11, it can be important to maintain up-to-date information about the position and/or relative layout of the at least one positional display element(s) 11, which can therefore allow communication(s) and/or data transfer(s) therebetween, such as can be used to create an image. Certain embodiments of the positional display element(s) 11 can be designed to be self-configuring. As such, a number of positional display element(s) 11 may be positioned at a prescribed position such as within a structure, field, building, etc. Certain embodiments of the positional display element(s) 11 can utilize self configuring techniques to effectively establish the positional display element(s) 11, that can include at least one of the positional display element(s) 11, and typically many of the positional display element(s). It may not be important that all positional display element(s) 11 within a network (such as can form the display) can contain all of the data relating to that network. It may be important, however, at least certain positional display element(s) 11 that are situated within the display (e.g., that may be configured as a network) can therefore be able to configure themselves and others appropriately, and thereupon transfer at least some data and/or information relating to the positional display element(s) 11 therebetween.

To facilitate determination of position and/or layout of the positional display element(s) 11, at least one signal may be communicated between the positional display element(s) 11 (henceforth, 'signaling the positional display element(s)'), which may result in one or more return signals being returned to the positional display element. The position of the positional display element(s) 11 may be derivable from the positional information being transferred within the signal and/or the return signal. Although the positional display element(s) 11 may not have sufficient power to communicate back to an external source, it may be possible for their neighbor(s) to detect the response signals and forward the signal to a desired position.

Between certain embodiments of the positional display element(s) 11 and/or other devices, signaling may be accomplished wirelessly, for example, utilizing some form of electromagnetic radiation such as sound or light signals. In certain embodiments, those positional display element(s) 11 that receive a signal may harness the energy of the signaling to provide one or more return signals. In certain embodiments, the positional display element(s) 11 may provide a phosphorescent response to signaling with light. For example, the positional display element(s) 11 may be present in a dark nighttime or underwater environment. When stimulated by a quick, intense light pulse, the positional display element(s) 11 may phosphoresce, thus providing a marker to their position which could be viewed by a person, camera, recording device, etc. 120.

The positional display element(s) 11 may be signaled from one or more positions external and/or internal to the at least one positional display element(s) 11. The signal may be provided to at least some positional display element(s) 11 more or less simultaneously, or may propagate through the network including the positional display element(s) 11. Thus, some positional display element(s) 11 may receive the signal to report position, and the first positional display element(s) 11 to receive the signal may provide one or more return signals, and may signal one or more neighbor positional display element(s) 11 to provide a position, etc. The neighbor positional display element(s) 11 may provide one or more return signals, signal their neighbors, and so on. For example, certain embodiments of the positional display element(s) 11 may be a part of a security system over the display. The device(s) (not shown) may communicate to the nearest positional display element(s) 11 using the positional display element's communication interface (not shown), causing the positional display element(s) 11 to respond with position information and signal its neighbor positional display element(s) 11. The neighbor positional display element(s) 11 may then respond to positional display element(s) 11 with its position information, which the positional display element(s) 11 will pass on to the device. The positional display element(s) 11 may signal neighbor positional display element(s) 11, resulting in multiple ones of the positional display element(s) communicating their position among themselves and/or to/from other devices.

Signaling the positional display element(s) 11 may cause the positional display element(s) to return some of the identifying information such as at least one device identification (id). The device id may be used to identify those positional display element(s) 11 that are responding. In general, the positional display element(s) 11 may respond to the signaling in any manner that distinguishes the positional display element(s) 11 within the network. For example, the positional display element(s) 11 may respond with (a) one or more wireless identifiers, (b) one or more distinguishing light patterns and/or colors, or (c) one or more distinguishing sounds and/or tones. For example, certain embodiments of the positional display element(s) 11 communicating relative position information wirelessly may include a unique name, such as their wireless device identifier as part of the communication. The positional display element(s) 11 responding with light signals may flash in a pattern, for example, if the last two digits of their device number is 21 flashing 21 times. The positional display element(s) 11 responding using sound may respond with a particular tone, for example, by modifying the frequency of response from a base tone by adjusting an amount dependent on the positional display element(s) identifier.

In certain instances, the type, characteristics, or state of the positional display element(s) 11 may be indicated by the positional display element response. For example, the positional display element(s) 11 affecting a first visual presentation might respond to a signal by generating light at a first (e.g., red) wavelength to be displayed at a position of the display 21. The positional display element(s) 11 affecting a second visual presentation might respond by generating light at another (e.g., yellow) wavelength to be displayed at another position of the display 21.

In some implementations, the signaling may cause the positional display element(s) 11 to provide return signals indicative of its position relative to other positional display element(s) 11, as was discussed in the example where the positional display element(s) 11 returned information identifying their neighbors. In some implementations, signaling the positional display element(s) 11 may cause the positional display element(s) 11 to provide return signals indicative of a position of the positional display element(s) 11.

Some implementations may involve both types of information; certain positional display element(s) 11 may provide signals indicative of their position relative to other positional display element(s) 11, and certain positional display element(s) 11 may return signals indicative of an absolute position. For example, certain embodiments of positional display element(s) 11 used, for example, in a security system displaying to a large outdoor area may be of at least two types. Some positional display element(s) 11 may comprise GPS positional capability and communication interfaces. Other positional display element(s) 11 may comprise various relative position and a communication interface. The position of the positional display element(s) 11 may in certain instances be inferred by the known position of a reference neighbor, using calculations of their approximate distance to that reference neighbor made using ultrasound or in some other technique.

Some implementations of the positional display element(s) 11 may be signaled to provide return signals indicative of offsets from one or more previous positions. For example, in some implementations positional display element(s) 11 (such as "robot positional display element(s)") may be provided with a capability for directed and controllable movement. Certain embodiments of positional display element(s) can also provide the positional display element(s) 11 with a capability to calculate how far and/or in what direction they have moved. Thus, the positional display element(s) 11 may, as required, return information on their movement from an initial or previous position.

To prevent false return signals, a "prep" signal may be provided to the positional display element(s) 11, to prepare the positional display element(s) 11 for a subsequent signal to report positional information. Thus, a first signal to the positional display element(s) 11 may cause other positional display element(s) or other devices to be responsive to at least one subsequent signal to report its position. In certain instances, first two occurrences of the pattern act as a prep signal, the third as a trigger.

If frequent shifts in the relative of geographic position of the positional display element(s) 11 are expected, periodically (possibly automatic) signaling may be applied to cause the positional display element(s) 11 to periodically provide return signals indicative of their position. For example, the positional display element(s) 11 having neutral buoyancy may have been spread over a large lake, whereby they might be expected to follow currents throughout the lake. In addition, certain positional display element(s) included within the positional display element supporting region 264 may shift frequently. The positional display element(s) 11 may be queried periodically so that each might identify their current position.

In some implementations, the positions/layout may be expected to shift under certain conditions. In these situations signaling the positional display element(s) 11 may involve signaling to indicate their positions upon occurrence of one or more events and/or conditions associated with changes in positional display element 11 position/layout (henceforth, 'conditional signaling of the positional display element(s)'). For example, the positional display element(s) 11 may be signaled for position indications for the positional display element(s) 11 that provide out-of-range measurements. Certain ones of the positional display element(s) 11 may have shifted beyond their functional boundaries.

Conditional signaling of the positional display element(s) 11 may involve signaling to cause the positional display element(s) 11 that can provide signals indicative of their position upon receiving indications of a positional change from the positional display element(s) 11, or of the position of the display overall (e.g. the entire display has moved). Conditional signaling of the positional display element(s) 11 may take place as a result of turbulence in one or more media including the positional display element(s). Such triggering events may occur, for example, if the positional display element(s) 11 are situated in the air as those that can be configured as at least portions of billboards, then winds may trigger the signaling. Also if the positional display element(s) 11 are situated in water and/or supported by a fluid or air curtain, currents, fluid flows, or waves may trigger the signaling, etc. It may be advantageous, in certain embodiments of the positional display element(s) 11 to provide conditional signaling of the positional display element(s) 11 in such illustrative, but non-limiting, instances as to determine their position. Recognition that the positional display element(s) 11 may have moved or otherwise changed may occur by or be detected logic 108 that is situated either within, or external to, the positional display element(s) 11. Similarly, the signal which causes the relative position determining response may come from either somewhere within or external to the positional display element(s) 11. Such information that the positional display element(s) have moved should be considered as one embodiment of display information, such as to indicate where the positional display element(s) are positioned.

Certain signals returned by positional display element(s) 11 may be received and processed by one or more devices external to the positional display element(s) 11. Some instances may employ external processing of the positional information, whereas others will involve internal processing of the positional information by the positional display element(s) 11 itself. In some situations, both techniques may be employed.

The return signals may be processed to determine which positional display element(s) 11 have changed its position (henceforth, 'positional display element(s) movement determination'). In some cases where internal processing is employed. Movement determination of the positional display element(s) 11 may involve processing using the at least one positional display element(s) 11 to process the one or more return signals (of the neighbor positional display element(s) 11) to facilitate the determinations of whether they or their neighbor positional display element(s) 11 have changed positions. In the example given previously where the positional display element(s) 11 report their neighbors and this information is passed between positional display element(s) 11, such as to a desired data processing position, the signal strength of the received messages could be identified by each receiving positional display element(s) 11. The signal strength/distance analysis could be performed either by the receiving positional display element(s) 11 or elsewhere, possibly at a central information gathering point such as the device (not shown) such as a controller or computer. Whenever the received signal strength was very close in value to that previously received, a determination of little or no movement of the positional display element(s) may result.

In some implementations, signals may be repeatedly applied to certain embodiments of the positional display element(s) 11. Photos of emitted light, or other response indications of positional display element(s) 11 position, may be captured. When light is emitted in response, one or more combined photos may be created that include the captured information. In this manner, a visual record may be compiled indicating which positional display element(s) 11 have changed position, and their relative layout. A measured topology (layout) of the positional display element(s) 11 may be compared with desired or expected topologies, to determine deviations from the expected or desired layout.

Stereoscopic applications may involve positional display element(s) 11 providing return signals via light (e.g. the positional display element(s) 11 are actuated such as by lighting up in response to the signaling). Return signals may be captured by two or more devices (e.g. antenna entity 119 and/or inertial device entity 120) that are situated in different places. The captured return signals may be applied to facilitate 3-D position determinations for the responding positional display element(s) 11. Stereoscopic applications involving microphones and acoustic responses are also possible that can improve positioning within one, two, or three dimensions.

Certain embodiments of the positional display element(s) 11 may monitor changes in its own position and/or layout. Certain embodiments of the positional display element(s) 11 may signal other positional display element(s) 11 for the signaled positional information (henceforth, 'positional display element(s) signaling') from which it can derive its own position using, e.g., display information and/or display data.

Certain embodiments of the positional display element(s) 11 signaling may involve signaling neighboring positional display element(s) to provide return signals indicative of position, when the neighboring positional display element(s) 11 provide out-of-range readings. Out-of-range readings by a neighbor positional display element(s) 11 may indicate the positional display element has shifted position and is no longer within the functional bounds of the positional display element(s) 11. For example, if the positional display element(s) 11 becomes dislodged from its position and blows out into a room, it may start providing temperature readings of lesser value than its presumed (based on its previous position) neighbor(s) on either side. This may cause some of the positional display element(s) 11 to signal it to ascertain its position and/or a position of another positional display element.

In certain implementations, positional display element(s) 11 signaling may involve a positional display element(s) 11 signaling their neighbors for positional information, and when the neighbors fail to respond as expected, and/or when the neighbors provide a signal that is below an expected signal strength. These conditions may indicate that the neighbor positional display element(s) 11(s) have shifted out of bounds. In the ductwork example provided above, the positional display element(s) may be so distant that its previous neighbor positional display element(s) 11 do not receive its communications. Alternatively, the positional display element(s) 11 may be sending signals which are received as "weak". Either of these situations may cause the neighbor positional display element(s) 11 to initiate signaling of the positional display element(s) 11 in an attempt to ascertain its current position.

This disclosure describes a variety of signaling related to as least one positional display element(s) 11. The positional display element(s) 11 may be signaled for more than just position information. For example, the positional display element(s) 11 may be signaled to provide return signals indicative of its position, status, and/or condition. Examples of status/condition include whether the positional display element(s) 11 are functioning normally, have stored data available, are in communication with their neighbors, or for a variety of other reasons.

In certain embodiments of positional display elements, a visual map and/or layout including graphical indications of the position of positional display element(s) 11 may be constructed and/or refined according to received indications of the positions of positional display element(s) 11. Certain embodiments of a virtual map can be used to provide positional information and/or data pertaining to the positional display element(s). One or more 2D and/or 3-D maps and/or models of the positional display element(s) 11 may be formed according to the received indications of their position. This may involve overlaying position indications on an image or images representing the environment of the positional display element(s) 11. The graphical position indications may in some implementations be displayed via a projection system, via glasses that a person wears, on a screen, or via a heads-up display, for example.

Received indications of position of positional display element(s) 11 may include photographs or other representations of the positional display element(s) 11. The positional display element(s) 11 may respond to signaling with light, and these light responses may be captured by a camera and used to construct a map/layout of their positions.

Graphical position indications may indicate which positional display element(s) 11 have changed position or which are in a wrong or unexpected position. The graphical indications may also or alternatively indicate which positional display element(s) 11 are absent or not functioning at an expected position. Normally working positional display element(s) 11 may be shown in with green, yellow, or orange circles, depending on the temperatures they are reporting. The position of a suspect or non-working positional display element(s) 11 may be indicated.

In general, the graphical indications may reflect one or more received indications of the status and/or condition of the positional display element(s) 11, and/or overall statuses and/or conditions of the display 21 itself. Certain positions of the positional display element(s) 11 may be distinctively captured by a graphic. When suspect conditions are found to be pervasive or prevalent, for example if several of the positional display element(s) 11 in a display network are no longer reporting data or are reporting suspect data, an overall positional display element(s) 11 graphic or menu might be shown having different color, flashing, with more bold, or in any other visually distinctive manner. For example, a map displaying all positional display element positions might have its borders flashing red.

To configure the at least one positional display element(s) as a display, certain embodiments of the positional display element(s) determine where they are situated relative to the display or some other coordinate system (e.g., a wall, a piece of furniture, a building, a lake, a fluid-curtain, the air, etc.). One technique that can be used to determine the position of the positional display element(s) is, for each dimension of the display, to scan a beam of identifiable electromagnetic radiation along the positional display element(s) of the display. For example, the scanner can scan along the X-coordinate axis from X=0 (e.g., the left side) to X=the dimension of the opposite side. During the scanning process, the scanner or some other communication mechanism could describe the coordinate position of the scanning beam. As such, each scanned positional display element(s) will be able to determine when the scan beam is passing that positional display element based on the increase (e.g., spike-like or other) of electromagnetic radiation, and at that time the scanner could indicate the X-coordinate axis.

In an alternate embodiment, when the at least one positional display element(s) 11 of the display 21 senses the increase in electromagnetic radiation, then the positional display element(s) will transmit an indication to the scanner, other controller/computer, or controller portion of the positional display element(s) along with a device identifier. Thereupon, the scanner, other controller/computer, or controller portion of the positional display element(s) can derive the position of the positional display element(s) which can thereupon be transmitted to the particular positional display element(s). Other similar scanning and/or networking techniques can be used to determine the position of the positional display along a single axis. Thereupon, the position of the at least one positional display element(s) can be derived along each remaining axis of the display (e.g., in along the Y-axis and/or the Z-axis).

In still other embodiments, those embodiment(s) of the positional display element(s) that can determine their position relative to some position can utilize that determined position. For example, four positional display element(s) can be positively situated at each corner position of the display. Using wireless communications that can derive distance from other positional display element(s) using geometric derivations, such with motes (included in certain embodiments of the positional display element(s) as described herein), the at least one positional display element(s) can determine its position across the display in one, two, or three dimensions.

Such determination of the position of the positional display element(s) with respect to the display can be performed frequently for those positional display element(s) that move frequently with respect to the display. By comparison, the determination of the position of the positional display element(s) with respect to the display may be performed infrequently or hardly ever for those positional display element(s) that are static with respect to the display.

Figure 26:
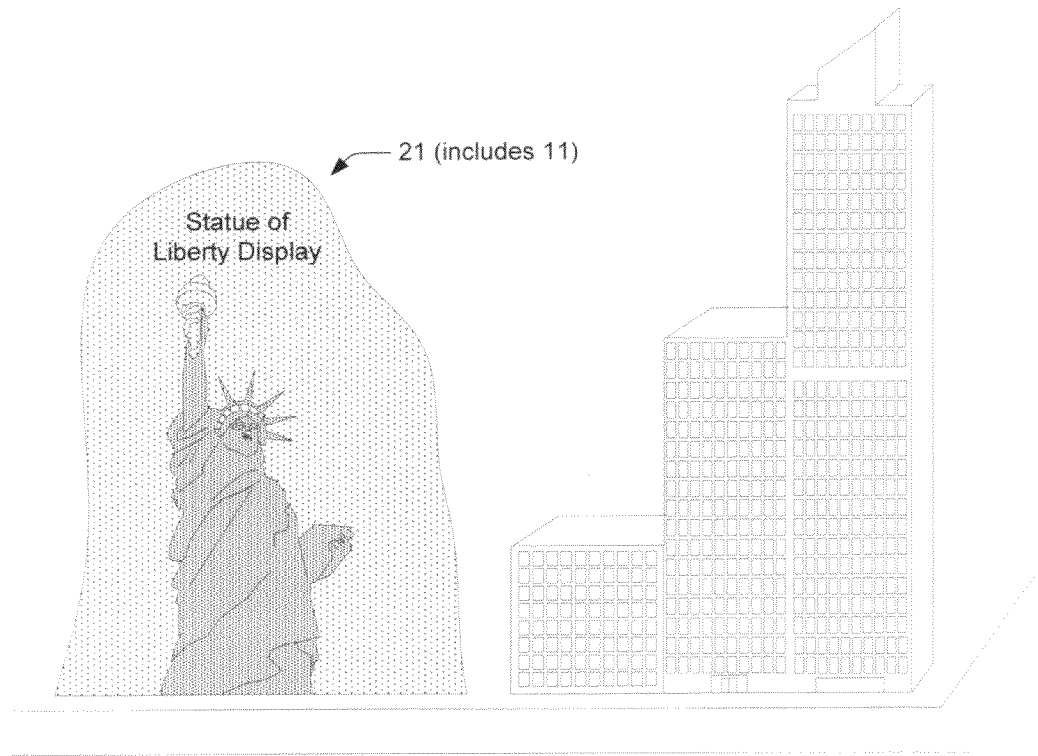
FIG. 26 is a view of one embodiment of a display cloud including the at least one positional display element(s).

One embodiment of the display 21, that can include the at least one positional display element(s) 11, is described with respect to FIG. 26. Certain embodiments of the display 21 can be configured as a display cloud in which numerous positional display elements can be maintained within an area. Many embodiments of large displays could utilize such a display cloud. The at least one positional display element(s) can be allowed to be arranged in an irregular configuration, similar to as described with respect to FIG. 2. Consider that the at least one positional display element(s) included in the embodiment of the display 21, as described with respect to FIG. 2, can be contained within a clear, translucent, opaque, or other container to limit excessive displacement of the positional display element(s) relative to or away from the display. By comparison, certain embodiments of the at least one positional display element(s) included in the embodiment of the display 21 as described with respect to FIG. 26 may not be contained within the container.

As such, certain embodiments of the positional display element(s) 11 may be free to move with respect to the display 21. As such, it may be desired to maintain certain embodiments of the at least one positional display element(s) with respect to the display. A number of mechanisms may be utilized to maintain the at least one positional display element(s) close to a desired location and/or suspended in air at some location and/or for some duration. For example, certain embodiments of the positional display element(s) 11 can be attached to, or at least partially integrated into, a balloon, a static or moving airfoil, a propeller, an air-jet, a spinner, or another such mechanism that can maintain the positional display element(s) in suspended positions. In addition, certain embodiments of the positional display element(s) can be attached to, or at least partially integrated into, a static or moving airfoil, a propeller, an air-jet, a spinner, or another mechanisms that can propel the positional display element(s) to a desired location, such as to affect the presentation of the display. In addition, another embodiment of the positional display element(s) can be attached to, or at least partially integrated into: a line or some other tethering mechanism that can be used to secure the positional display element with respect to some location or object. One or more of these mechanisms may be utilized in combination. For example, it may be desired to secure a balloon to suspend the at least one positional display element(s), and additionally keep the at least one positional display element tethered.

The embodiment of the display 21 as described with respect to FIG. 26 indicates that the at least one positional display element(s) can affect of wide variety of visual presentations, such as providing varied displays. In addition to affecting the visual presentations, certain embodiments of the at least one positional display element(s) could also affect such non-visual presentations as to produce sound, voices, speeches, etc. For example, music and/or speeches could be provided by the positional display element(s). In one illustrative embodiment, the Statue of Liberty display 21 as described with respect to FIG. 26 could also output a simultaneous imaged-firework display, which could be combined and/or sequenced with suitable music, sound of fireworks, heat of the fireworks, etc.

Certain embodiments of the display 21 can be large enough to display a life-sized replica of the Statue of Liberty in two or three dimensions. What can be displayed is limited only to the imagination of the user. The display could be situated indoors, outdoors, and/or a combination thereof. The particular presentation affected by the positional display element can also be modified. For example, the Statue of Liberty display could precede or follow a different presentation being affected for a sporting, a business, and educational, or another event. Certain embodiments of the display can be provided in a park or a business, and viewed in a similar manner as gatherings, movies, etc.

While the embodiment of the display 21 as described with respect to FIG. 26 is very large, it is also envisioned that certain of the presentation affecting and/or positional display element(s) can be varied in scale, complexity, resolution, optical characteristics, etc. A variety of technology can be utilized to provide the different embodiments of the positional display element(s) 11.

In certain embodiments of the display, it may be desired to add additional positional display element(s) to existing positional display element(s), such as to improve resolution, color, performance, operating parameters, and/or other desirable aspects. Such additional positional display element(s) can be added at one or more periods after the original positional display element(s), perhaps after the resolution or other technology improves. In certain embodiments, the additional positional display element(s) can be added to compensate for an undesirable operation of the original positional display element(s). Following the positioning of the additional positional display element(s), the additional positional display element(s) could determine their position either relative to other previously-scanned positional display element(s) (which have the capability of determining relative positioning), based on another scanning to determine position as described above, and or other similar networking or positioning techniques to determine the position. As the positions of the additional positional display element(s) are determined, the original positional display element(s) and the additional positional display element(s) can operate together as the display.

IV. Examples of Light Generation by Positional Display Element

Figure 13:
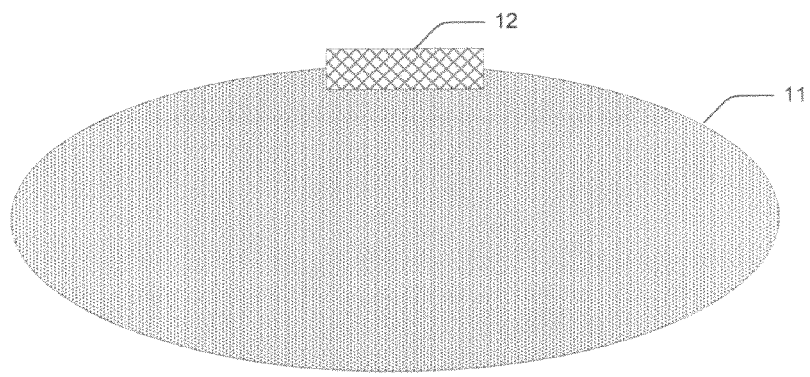
FIG. 13 is a diagram of one embodiment of the at least one positional display element.
Figure 14:
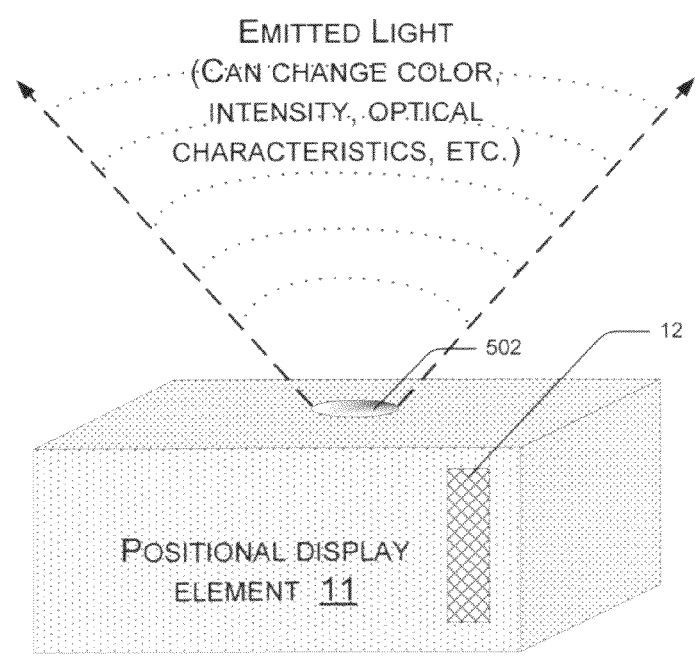
FIG. 14 is a diagram of another embodiment of the at least one positional display element.

There are a variety of techniques by which the positional display element(s) 11 can generate light, or cause light to be generated, such as could be used to provide at least a portion of the display. The particular shape or surface configuration of the positional display element(s) 11 (and the associated antenna to the positional display element(s)) as illustrated in FIGS. 13 and 14 are intended to be illustrative in nature, and not limiting in scope. Certain embodiments of the positional display element(s) can generate light based upon the position of the positional display element, and the desired information of the positional display element at that moment. Positional display element(s) can be constructed or fabricated in any desired shape. The embodiment of the positional display element(s) 11, as described with respect to FIG. 13, can be configured such that at least one of its surfaces changes color to identify to a maintaining person or maintaining device when it should be maintained. In one embodiment of the positional display element(s) 11 as described with respect to FIG. 13, the color of at least a portion of a surface of the positional display element can be changed, for example, to change a color produced by a portion of the display. Such change in color(s) of the positional display element(s) can be observed by a person or a mechanism looking at the display. Liquid Crystal Display (LCD) provide one embodiment of devices that change colors to alter a displayed color. Certain embodiments of the positional display element(s) can be included in a passive display in which at least some light reflects off, or travels through, the positional display element(s). Certain embodiments of the positional display element(s) can be included in an active display in which at least some light is applied to, and passes through, the positional display element(s) of the display.

Another example of a positional display element that can be used to change color for at least a portion of the display may allow a mechanical change in color, such as may include coloring different surfaces of the positional display element(s) in two colors. As such, during normal operation, one color of the positional display element(s) that is typically facing upwards will be painted a first color (not shown). As particular positional display element(s) are identified as those to be maintained, the positional display element(s) can be "flipped over" using, e.g., some maintaining devices, identifying device, or even a positional actuator located within the positional display element(s) itself, such that the new surface is being exposed on the maintaining device is of a different color that can be observed by an individual. Other embodiments of positional display elements can produce or generate light or other electromagnetic radiation that can be distributed from a region 502. A light emitting diode (LED), for example, represents one embodiment of a light-emitting device. Certain embodiments of the positional display element(s) 11 can be configured to emit and/or control emission of light or other electromagnetic radiation.

Certain embodiments of positional display element(s), as described in this disclosure, could also provide non-visual information to, at least in parts affect the visual presentation. Such non-visual information could also include, e.g.: vibrating, clicking, buzzing, providing a voice signal, providing a signal of some frequency that may or may not be audible by human ears but might be to the maintaining device or controller, change shape and/or position, etc. Such change of an outward appearance of certain embodiments of the positional display element(s) can be detected by a human, or alternatively a mechanism as a portion of the display. Certain embodiments of image processing and/or filtering techniques can be used to change color and/or intensity.

Another embodiment of positional display element(s) 11 can be configured to emit light of a recognizable color, brightness, blinking rate, etc. In one embodiment, a light emitting diode (e.g., LED) or display device can be actuated as desired. As such, the positional display element(s) 11 can be configured to emit a particular color if it is desired.

Certain embodiments of positional display element(s) 11 can output light using the antenna 12 or other suitable portion of the positional display element(s).

Certain embodiments of the positional display element(s), as described herein, can be configured to position the at least one positional display element(s) such as, but not limited to, providing the exact geographic position of each positional display element(s). Other embodiments of the positional display element(s) 11 can be configured to provide their absolute or relative positions, utilizing a variety of techniques such as provided by global positioning systems (GPS, many of which are commercially available), RNAV, very-high-frequency omni-directional range (VOR), radio locating/ranging, or other such known positioning devices. Positional display element(s) that are situated within a room can establish coordinates with respect to that room, etc. As such, the selection of a particular coordinate axis by which the positional display element(s) operate may depend largely upon the positioning of the positional display element(s) themselves, and a user of the positional display element(s) could determine a convenient coordinate axis depending upon the positioning of the positional display element(s) to be maintained. These examples of positional information coordinate axis are not intended to be limiting in scope.

In certain embodiments, the positioning of the positional display element(s) can be largely automated, and can rely upon a variety of automated techniques (e.g., such as those understood to those skilled in the robotics arts), to determine the position of the particular positional display element(s).

V. Examples of Computers/Controllers

This disclosure describes a number of embodiments of the positional display element(s) that can be configured to produce at least a portion of an image to be displayed. The process associated with positioning of the positional display element(s), and displaying information to affect the visual presentation, can be performed at least partially within the positional display element(s) 11, peripherals or other devices associated with the positional display element(s), and/or devices distinct from the positional display element(s) 11 as is understood by those skilled in networking techniques and devices. As such, this portion describes number of embodiments of the computer/controller that operate in a similar fashion whether it is integrated within the peripheral display element(s), and/or some associated or related device.

Certain embodiments of the positional display element(s) 11 can be applied to provide a large variety of displaying, positioning, and/or controlling applications, including but not limited to, affecting a variety of visual presentations. It is envisioned that the operation of a single positional display element(s) 11 can be varied, such as by reconfiguring the user interface, downloading different software, hardware, and/or firmware, transmitting signals, etc. Varying the role of the positional display element(s) 11 can provide different visual presentation affecting applications based at least in part on varying a configuration or operation of a computer/controller 18 that can be configured to interface with the positional display element(s) 11. This portion describes certain embodiments of the computer/controller 18 that may be configured to allow such functionality and alterability with respect to the positional display element(s) 11 and/or the computer/controller 18. As such, the processor 605, the memory 607, the circuit 609, and/or the input/output 611 are illustrated in each of the positional display element(s) 11 and the computer/controller 18, since each of these devices can be configured to perform processing operations, positioning operations and/or affect visual presentations at least partially using the positional display element(s) 11.

Certain embodiments of the controller 18 can provide a signal to, or receive a signal from, positional display element(s) or other devices. In some cases, the signal may be provided to positional display element(s) 11 nearby to or communicating with the controller, or to positional display element(s) specifically enabled to recognize the controller signal. In some implementations, the controller positional display element(s) may, in fact, form a part of the positional display element(s) 11 signalled.

Many embodiments of the positional display element(s) 11 utilize processing, timing, filtering and/or other techniques when performing a variety of displaying operations. Such processing, timing, filtering, and/or other techniques can be at least partially performed and/or controlled within each individual positional display element(s) 11 at least partially using the controller portion 19. In many embodiments, the processing, timing, filtering, and/or other techniques can be at least partially controlled, externally of the positional display element(s) 11, using the computer/controller 18. In many embodiments, the controller portion 19 integrated in certain embodiments of the positional display element(s) 11 can interoperate with the computer/controller 18 using known networking techniques. As such, depending upon the particular positional display element(s) 11 design, application, configuration, etc., a certain amount of the control of the operations of each positional display element(s) 11 can be provided either within the controller portion 19, or alternatively within the computer/controller 18.

FIG. 10 shows one embodiment of the computer/controller 18 (which can include a computer, mote, microprocessor, microcontroller, etc.) as can be integrated within certain embodiments of the positional display element(s) 11 to assist in providing the sharing of at least portions of data and/or other information associated with the positional display element(s) 11. In certain operations and/or structures, as described with respect to the computer/controller 18 that is distinct from the positional display element(s) 11, can also apply to the operations and structures of the controller portion 19 that is integrated within the positional display element(s) 11. Certain displaying-related aspects, such as synchronization and/or designation of aspects as described within this disclosure, can be performed by the computer/controller 18, and/or the controller portion 19. As such, in different embodiments, the positional display element(s) 11 can be operably coupled to each other and/or the computer/controller 18.

As described within this disclosure, multiple embodiments of the positional display element(s) 11 may be able to transfer a variety of data and/or information, etc. to each other via the antennas 12. One embodiment of the computer/controller 18 (that therefore may also be included in the controller portion 19) includes a processor 605 such as a central processing unit (CPU), a memory 607, a circuit or circuit portion 609, and an input output interface (I/O) 611. In certain embodiments, the I/O 611 may include a bus (not shown). In certain embodiments, the processor 605 can have a more limited capacity than perhaps a CPU, such as would occur if the computer/controller 18 included a microprocessor or microcomputer. Different embodiments of the computer/controller 18 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the computer/controller 18 can be physically or operably configurable in each positional display element(s) 11 as described with respect to FIG. 10. In certain embodiments of the positional display element(s) 11, the processor 605 as described with respect to FIG. 10 performs the processing and arithmetic operations for the computer/controller 18. The computer/controller 18 controls the signal processing, database querying and response, computational, timing, data transfer, and other processes associated with the positional display element(s) 11. In certain embodiments, one or more simplified versions of the computer/controller 18 that can be provided with respect to FIG. 10, could be configured to provide a transfer of data or other information and/or data between multiple positional display element(s) 11 and/or the computer/controller 18.

Certain embodiments of the memory 607 include random access memory (RAM) and read only memory (ROM) that together store the computer programs, operands, and other parameters that control the operation of the positional display element(s) 11. In certain embodiments, the memory can include flash memory or other similar memory components. The memory 607 can be configurable to contain the data or information obtained, retained, or captured by that positional display element(s) 11 (that may be configurable in different embodiments as the peripheral positional display element(s) 11) such as are used to affect the visual presentation (display).

In certain embodiments, the bus (not illustrated) can be configurable to provide for digital information transmissions between the processor 605, circuits 609, memory 607, and/or the I/O 611 as described with respect to FIG. 10. In this disclosure, the memory 607 can be configurable as RAM, ROM, flash memory, semiconductor-based memory, or any other type of memory that is configurable to store data or other information pertaining to positional display element(s) 11. The bus also connects I/O 611 to the portions of the positional display element(s) 11 that either receive digital information from, or transmit digital information to other positional display element(s).

Many embodiments of the antennas 12 can be configured as both transmitting and receiving devices. As such, each one of the positional display element(s) 11 and/or the computer/controller 18 can be configured to transmit information to other devices, as well as receive information from other devices. Each antenna 12 can be configured to provide effective communications to other devices, and therefore can include, but are not limited to, the radio frequency signals, wireless signals, optical signals, infrared signals, etc.

The memory 607 can provide one example of a memory storage portion that can, for example, store information or data relating to positional display element(s) 11 displaying, and/or computer instructions relating to device operations, etc. In certain embodiments, the monitored value includes, but is not limited to: a percentage of the memory 607, a certain amount of information relating to the positional display element(s) 11 that is stored in the memory 607, or at other suitable positions.

The memory 607 can be configured to provide for overflow, primary, secondary, or additional positioning and/or displaying ability for the memory 607 of certain embodiments of the positional display element(s) 11 and/or the computer/controller 18 (e.g. when the monitored value of data within the memory 607 exceeds a prescribed value). Other embodiments of the memory 607 can be configurable as a mobile random access memory (RAM) device, a flash memory device, a semiconductor memory device, or any other memory device (that may or may not be distinct from the memory 607) that can store data or other information within the memory 607.

In certain embodiments of the positional display element(s) 11, the particular elements of the computer/controller 18 (e.g., the processor 605, the memory 607, the circuits 609, and/or the I/O 611) can provide a monitoring function to monitor the amount of data or information therewithin. Such a monitoring function by the positional display element(s) 11 can be compared to a prescribed limit, such as whether the display information (or data) contained in the memory 607, the amount of data contained within the memory 607, or some other measure relating to the memory is approaching some value. In certain embodiments, the memory 607 stores data or information relating to the positional display element(s) 11. In certain embodiments the measure relating to the memory approaching some value may pertain to some displayed parameter, such as may be associated with the operation of the positional display element(s) 11.

In certain embodiments, the I/O 611 provides an interface to control the transmissions of digital information between each of the components in the computer/controller 18. The I/O 611 also provides an interface between the components of the computer/controller 18 and different portions of the positional display element(s) 11. The circuits 609 can include such other user interface devices as a display and/or a keyboard (which can be varied, miniaturized, and/or be provided in a variety of graphical-based user interfaces for certain embodiments of positional display element(s) 11).

VI. Examples of Flow Charts for Positional Display Element(S)

This portion of the disclosure describes a number of flow charts that can relate to a variety of displays that include at least one of the positional display element(s) 11.

Figure 16:
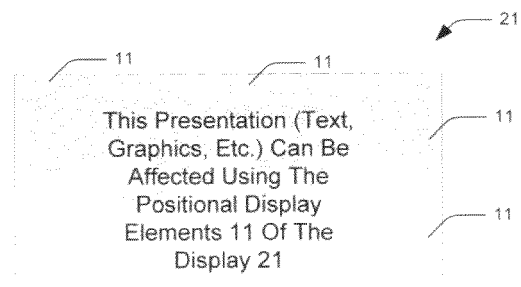
FIG. 16 is a generalized diagram of another embodiment of the at least one positional display element.

One generalized embodiment of the at least one positional display element(s) is described with respect to FIG. 16, in which a number of positional display elements are associated with the display 21. In certain embodiments, the positional display elements 11 can be attached, adhered, or otherwise situated with respect to a substrate (not illustrated) included within the display 21. The substrate can include a solid or flexible material, as described in this disclosure. In other embodiments, the positional display elements can be suspended in a fluid curtain such as a liquid or gas, in which instances the positional display elements can be displaced with respect to each other and/or of the display. In certain embodiments, as described in this disclosure, the positional display elements have sufficient positional processing capabilities to determine their position with respect to other positional display elements, the display, some location on earth, etc. Based at least partially upon the determined position of the positional display elements, at least a portion of an image can be displayed in a manner corresponding to affecting the presentation, as described in this disclosure. In certain embodiments, one or more controller/computers can be provided to assist in the determining to position of the positional display elements, and/or displaying the image. The positional display elements to 11 within the display 21 as illustrated in FIG. 16 may be sufficiently small such that affecting the presentation of certain ones of the positional display elements can, in certain embodiments, create the effect of writing, images, data, and/or information, etc. as presented by the display with considerable detail. In general, the smaller the light-emitting dimensions of the different positional display elements in combination with the more densely the positional display elements are packed on the display may lead to improved resolution, image quality, reliability, etc. of the display. The opposite of the last statement is also true. In certain embodiments, at least certain ones of the positional display elements 11 as described with respect to FIG. 16.

Figure 17A:
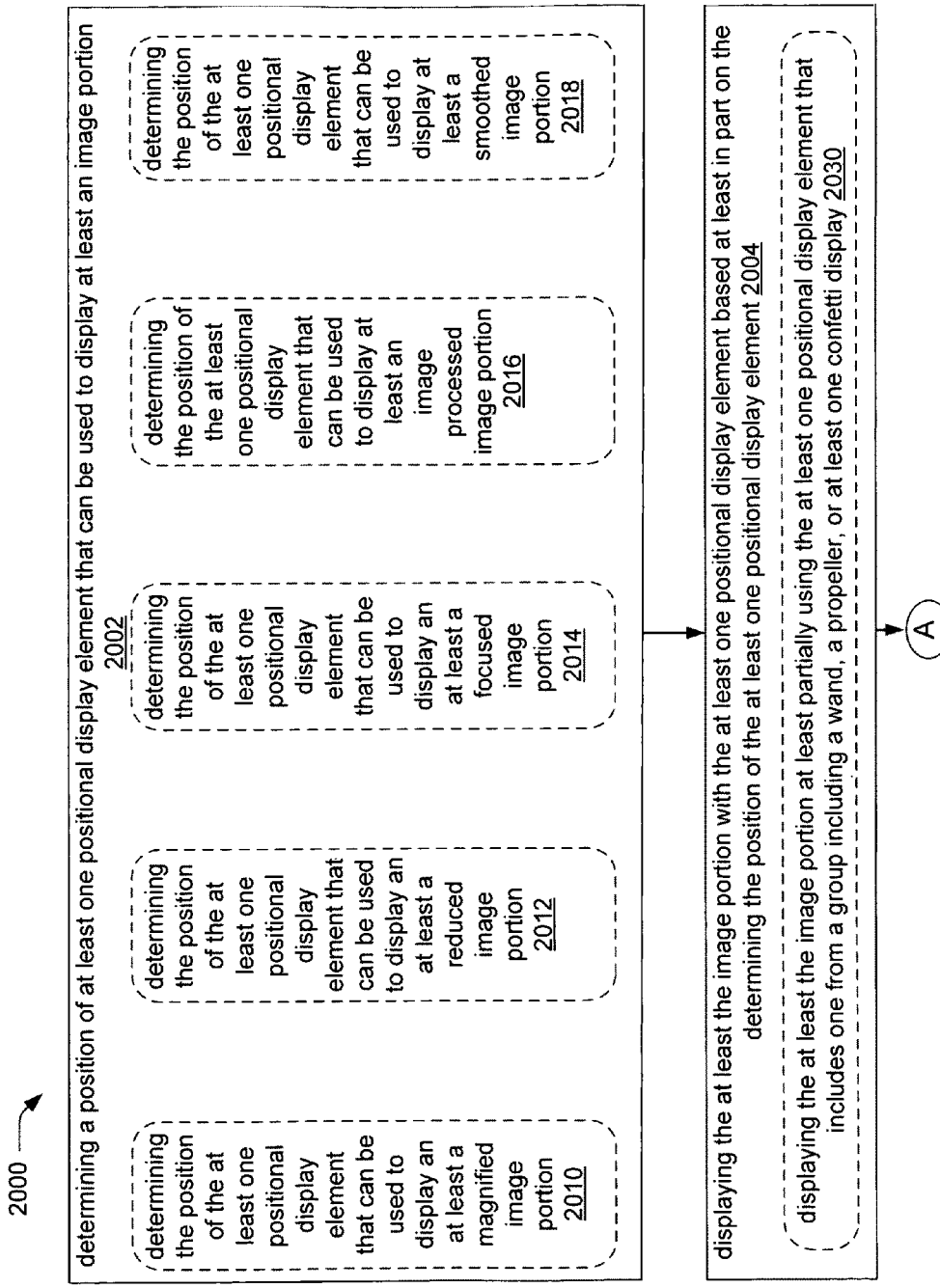

One embodiment of a high-level flowchart of a positional display element technique 2000 is described with respect to FIGS. 17a, 17b, and 17c and includes, but is not limited to, operations 2002 and 2004, as well as optional operations 2032, 2036, 2038, 2040, 2042, 2044, 2046, 2048, 2052, 2056, 2060, and/or 2062. Operation 2002 can include, but is not limited to, optional operations 2010, 2012, 2014, 2016, and/or 2018. Operation 2004 can include, but is not limited to, optional operation 2030. The high-level flowchart of FIGS. 17a, 17b, and 17c should be considered in combination with the positional display element(s) 11, as described with respect to FIG. 16. One embodiment of operation 2002 can include, but is not limited to, determining a position of at least one positional display element that can be used to display at least an image portion. For example, the position of the at least one positional display element 11 can be determined with respect to the display 21, other positional display element(s), or other computer/controller devices utilizing scanning techniques or other position-determining techniques, as described in this disclosure. One embodiment of operation 2004 can include, but is not limited to, displaying the at least the image portion with the at least one positional display element based at least in part on the determining the position of the at least one positional display element. For example, the at least the portion of the image can be displayed using the at least one positional display element by generating light, photonic radiation, or other electromagnetic radiation such as can be used to display the at least the portion of the image. One embodiment of the determining a position of at least one positional display element that can be used to display at least an image portion of operation 2002 can include operation 2010, that can include, but is not limited to, determining the position of the at least one positional display element that can be used to display an at least a magnified image portion. For example, the at least one positional display element can be used to generate at least a part of a magnified image. One embodiment of the determining a position of at least one positional display element that can be used to display at least an image portion of operation 2002 can include operation 2012, that can include, but is not limited to, determining the position of the at least one positional display element that can be used to display an at least a reduced image portion. For example, the at least one positional display element can be used to generate at least a part of a reduced image. One embodiment of the determining a position of at least one positional display element that can be used to display at least an image portion of operation 2002 can include operation 2014, that can include, but is not limited to, determining the position of the at least one positional display element that can be used to display an at least a focused image portion. For example, the at least one positional display element can be used to generate at least a part of a focused image. One embodiment of the determining a position of at least one positional display element that can be used to display at least an image portion of operation 2002 can include operation 2016, that can include, but is not limited to, determining the position of the at least one positional display element that can be used to display at least an image processed image portion.

For example, the at least one positional display element can be used to generate at least a part of an image processed image portion, such as by using filtering, image imperfection reduction, and/or other suitable image processing techniques. One embodiment of the determining a position of at least one positional display element that can be used to display at least an image portion of operation 2002 can include operation 2018, that can include, but is not limited to, determining the position of the at least one positional display element that can be used to display at least a smoothed image portion. For example, the at least one positional display element can be used to generate at least a part of a smoothed image. One embodiment of the displaying the at least the image portion with the at least one positional display element based at least in part on the determining the position of the at least one positional display element can include operation 2030 that can include, but not limited to, displaying the at least the image portion at least partially using the at least one positional display element that includes one from a group including a wand, a propeller, or at least one confetti display. For example, at least one from the above group is used to display the at least the image portion. One embodiment of operation 2032 can include, but is not limited to, wherein the determining a position of at least one positional display element that can be used to display at least an image portion is performed at least partially at the at least one positional display element. For example, the least the one positional display element can be used to determine its own position. One embodiment of operation 2036 can include, but is not limited to, wherein the determining a position of at least one positional display element that can be used to display at least an image portion is performed at least partially at a device that is distinct from the at least one positional display element. For example, the device that is distinct from the at least one positional display element can be used to determine the position of the at least a one positional display element. One embodiment of operation 2038 can include, but is not limited to, wherein the at least one positional display element is secured with respect to a group including at least one of a connector, a mesh, or a fabric. For example, at least one from the group including the connector, the mesh, and/or the fabric can be used (e.g., acting as a substrate) to secure the at least one positional display element. One embodiment of operation 2040 can include, but is not limited to, wherein the at least one positional display element includes at least one from a group including a mote display element, an LCD-based display element, or a plasma-based display element. For example, the least one positional display element includes at least one from the group of the mote (that can be used to generate light, or control light to be generated by a light generating device), the LCD-based display element, and/or the plasma-based display element. One embodiment of operation 2042 can include, but is not limited to, arranging a plurality of the at least one positional display elements in a regular array. For example, multiple ones of the positional display element(s) are arranged in a regular array such that the spacing (in one dimension, two dimensions, or three dimensions) between multiple positional display elements are substantially regular. One embodiment of operation 2044 can include, but is not limited to, arranging a plurality of the at least one positional display elements in an irregular configuration. For example, multiple ones of the positional display elements are arranged in an irregular configuration. One embodiment of operation 2045 can include, but is not limited to, compensating an irregular attribute of the at least one positional display element with respect to at least one other positional display element. For example, compensating for the irregular attribute of the Positional Display Element(s) 11 that can include such attributes as dimensions, size, shapes, optical characteristics, etc. One embodiment of operation 2046 can include, but is not limited to, arranging a plurality of the at least one positional display elements in an irregular pattern. For example, configuring multiple ones of the positional display element(s) in an irregular pattern, spacing, shape, etc. One embodiment of operation 2048 can include, but is not limited to, compensating an irregular intensity of the at least one positional display element with respect to at least one other positional display element, in which the irregular intensity at least partially results from the arranging the plurality of the at least one positional display elements in the irregular pattern. For example, compensating for an irregular intensity of the at least one positional display element(s). One embodiment of operation 2052 can include, but is not limited to, compensating an irregular conformation of the at least one positional display element with respect to at least one other positional display element at least partially by employing the locations of the at least one positional display element to compensate the irregular conformation. For example, compensating for an irregular compensation of the least one positional display element(s). One embodiment of operation 2056 can include, but is not limited to, compensating an irregular orientation of the at least one positional display element with respect to at least one other positional display element at least partially by employing the locations of the at least one positional display elements to compensate the irregular orientation. For example, compensating for an irregular orientation of the least one positional display element(s) 11, as described in this disclosure. One embodiment of operation 2060 can include, but is not limited to, compensating an irregular attribute of the at least one positional display element with respect to at least one other positional display element at least partially by employing the locations of the at least one positional display elements to compensate the irregular attribute. For example, compensating for the irregular attribute resulting from the irregular attribute. One embodiment of operation 2062 can include, but is not limited to, allowing at least a first one of the at least one positional display element to be displaced with respect to at least a second one of the at least one positional display element, wherein the at least the first one of the at least one positional display element and the at least the second one of the at least one positional display element could be utilized in the displaying the at least the image portion both prior to or after the allowing the at least the first one of the at least one positional display element to be displaced. For example, allowing at least certain of the at least one positional display element(s) to be relatively displaced with respect to at least certain of the other positional display element(s). The order of the operations, methods, mechanisms, etc. as described with respect to FIGS. 17a, 17b, and 17c are intended to be illustrative in nature, and not limited in scope.

One embodiment of a high-level flowchart of a positional display element addressing technique 2200 is described with respect to FIGS. 18a and 18b and includes, but is not limited to, operations 2202 and 2203, as well as optional operations 2204, 2205, 2206, 2207, 2208, 2210, and/or 2212. The high-level flowchart of FIGS. 18a and 18b should be considered in combination with the positional display element(s) 11, as described with respect to FIG. 16. One embodiment of operation 2202 can include, but is not limited to, addressing at least one positional display element that can be used to derive an addressed position of the at least one positional display element. For example, providing the at least one positional display element(s) with the address to be used to derive the position. One embodiment of operation 2203 can include, but is not limited to, displaying at least a portion of an image using the at least one positional display element based at least in part on the addressing the at least one positional display element that can be used to derive the addressed position of the at least one positional display element. For example, displaying at least a portion of the image using the least one positional display element, as described in this disclosure. One embodiment of operation 2204 can include, but is not limited to, wherein the addressing the at least one positional display element is performed at least partially at the at least one positional display element. For example, performing the addressing of the least one positional display element(s) at least partially at the at least one positional display element(s). One embodiment of operation 2205 can include, but is not limited to, wherein the addressing the at least one positional display element is performed at least partially at a device that is distinct from the at least one positional display element. For example, performing the addressing of the least one positional display element(s) at least partially at a device that is distinct from the at least one positional display element. One embodiment of operation 2206 can include, but is not limited to, further comprising allowing at least a first one of the at least one positional display element to be displaced with respect to at least a second one of the at least one positional display element, wherein the at least the first one of the at least one positional display element and the at least the second one of the at least one positional display element could be utilized in the displaying the at least the portion of the image both prior to or after the allowing the at least the first one of the at least one positional display element to be displaced. For example, allowing displacement between multiple ones of the at least one positional display element(s) to be relatively displaced while maintaining the display. One embodiment of operation 2207 can include, but is not limited to, wherein the addressing at least one positional display element that can be used to derive an addressed position of the at least one positional display element is performed at least partially within the at least one positional display element. For example, addressing the at least one positional display element within the at least one positional display element. One embodiment of operation 2208 can include, but is not limited to, wherein the addressing at least one positional display element that can be used to derive an addressed position of the at least one positional display element is performed at least partially in a controller device that is operationally situated externally to the at least one positional display element. For example, addressing the at least one positional display element externally of the at least one positional display element. One embodiment of operation 2210 can include, but is not limited to, wherein the displaying at least a portion of an image using the at least one positional display element is performed at least partially within the at least one positional display element. For example, displaying the at least the portion of the image at least partially within the at least one positional display element(s). One embodiment of operation 2212 can include, but is not limited to, wherein the displaying at least a portion of an image using the at least one positional display element is performed at least partially in a controller device that is operationally situated externally to the at least one positional display element. For example, displaying the at least a portion of the image at least partially from a device external of the at least one positional display element(s). The order of the operations, methods, mechanisms, etc. as described with respect to FIGS. 18a and 18b are intended to be illustrative in nature, and not limited in scope.

One embodiment of a high-level flowchart of a positional display element addressing technique 2400 is described with respect to FIG. 19 and includes, but is not limited to, operation 2402 and 2404, as well as optional operations 2406, 2408, 2410, 2412, and/or 2414. The high-level flowchart of FIG. 19 should be considered in combination with the positional display element(s) 11, as described with respect to FIG. 16. One embodiment of operation 2402 can include, but is not limited to, addressing at least one positional display element that can be used to derive an addressed position of the at least one positional display element. For example, addressing the at least one positional display element to derive the addressed position of the at least one positional display element. One embodiment of operation 2404 can include, but is not limited to, affecting a visual presentation at least partially using the at least one positional display element based at least in part on the addressing the at least one positional display element that can be used to derive the addressed position of the at least one positional display element. For example, affecting the visual presentation at least partially using the at least one positional display element. One embodiment of operation 2406 can include, but is not limited to, further comprising allowing at least a first one of the at least one positional display element to be displaced with respect to at least a second one of the at least one positional display element, wherein the at least the first one of the at least one positional display element and the at least the second one of the at least one positional display element could be utilized in the affecting the visual presentation both prior to or after the allowing the at least the first one of the at least one positional display element to be displaced. For example, allowing relative displacement between multiple ones of the at least one positional display element(s) while maintaining the display. One embodiment of operation 2408 can include, but is not limited to, wherein the addressing at least one positional display element that can be used to derive an addressed position of the at least one positional display element is performed at least partially within the at least one positional display element. For example, performing the addressing at least partially within the at least one positional display element(s). One embodiment of operation 2410 can include, but is not limited to, wherein the addressing at least one positional display element that can be used to derive an addressed position of the at least one positional display element is performed at least partially in a controller device that is operationally situated externally to the at least one positional display element. For example, performing the addressing at least partially within a controller device that is operationally situated externally to the at least one positional display element(s). One embodiment of operation 2412 can include, but is not limited to, wherein the affecting a visual presentation at least partially using the at least one positional display element is performed at least partially within the at least one positional display element. For example, affecting the visual presentation at least partially within the at least one positional display element(s). One embodiment of operation 2414 can include, but is not limited to, wherein the affecting a visual presentation at least partially using the at least one positional display element is performed at least partially in a controller device that is operationally situated externally to the at least one positional display element. For example, affecting the visual presentation at least partially in a controller device that is operationally situated externally to the at least one positional display element(s) 11. The order of the operations, methods, mechanisms, etc. as described with respect to FIG. 19 are intended to be illustrative in nature, and not limited in scope.

One embodiment of a high-level flowchart of a positional display element displaying technique 2600 is described with respect to FIG. 20 and includes, but is not limited to, operation

2602, as well as optional operation 2604. The high-level flowchart of FIG. 20 should be considered in combination with the positional display element(s) 11, as described with respect to FIG. 16. One embodiment of operation 2602 can include, but is not limited to, displaying at least an image portion using at least one displaceable positional display element, wherein the at least one displaceable positional display element displays the at least the image portion considering an ephemeral position of the at least one displaceable positional display element with respect to an image including the at least the image portion, wherein the ephemeral position can be a result of both changes in a physical position of the at least one displaceable positional display element and changes in a position of the image. For example, displaying the image portion considering the ephemeral position of the at least one positional display element(s) 11. One embodiment of operation 2604 can include, but is not limited to, allowing at least a first one of the at least one displaceable positional display element to be displaced with respect to at least a second one of the at least one displaceable positional display element, wherein the at least the first one of the at least one displaceable positional display element and the at least the second one of the at least one displaceable positional display element could be utilized in the displaying the at least the image portion both prior to or after the allowing the at least the first one of the at least one displaceable positional display element to be displaced. For example, allowing displacement between multiple ones of the at least one positional display element(s) while maintaining the display. The order of the operations, methods, mechanisms, etc. as described with respect to FIG. 20 are intended to be illustrative in nature, and not limited in scope One embodiment of a high-level flowchart of a positional display element arranging technique 2700 is described with respect to FIG. 21 and includes, but is not limited to, operations 2702, 2704, and/or 2706 as well as optional operation 2710. Operation 2702 can include, but is not limited to, optional operations 2712, 2714, 2716, and/or 2718. The high-level flowchart of FIG. 21 should be considered in combination with the positional display element(s) 11, as described with respect to FIG. 16. One embodiment of operation 2702 can include, but is not limited to, arranging at least one positional display element in an irregular pattern. For example, arranging in the at least one positional display element in the regular pattern such as by using irregular spacing. One embodiment of operation 2704 can include, but is not limited to, determining a relative position of the at least one positional display element that have been arranged in the irregular pattern. For example, determining the relative position of the at least one positional display element(s). One embodiment of operation 2706 can include, but is not limited to, displaying at least a portion of an image at least partially in response to the determining the relative position of the at least one positional display element that have been arranged in the irregular pattern. For example, displaying at least a portion of the image at least partially in response to determining the relative position of the at least one positional display element(s). One embodiment of operation 2710 can include, but is not limited to, allowing at least a first one of the at least one positional display element to be displaced with respect to at least a second one of the at least one positional display element, wherein the at least the first one of the at least one positional display element and the at least the second one of the at least one positional display element could be utilized in the displaying the at least the portion of the image both prior to or after the allowing the at least the first one of the at least one positional display element to be displaced. For example, allowing multiple ones of the at least one positional display element to be displaced while displaying an image thereupon. The arranging at least one positional display element in an irregular pattern of operation 2702 can include operation 2712, that can include, but is not limited to, suspending the at least one positional display element in a suspending media. For example, suspending the at least one positional display element in a suspending media, such as the fluid curtain. The arranging at least one positional display element in an irregular pattern of operation 2702 can include operation 2714, that can include, but is not limited to, attaching the at least one positional display element to a substrate. For example, attaching the at least one positional display element to the substrate, such as a wall, piece of fabric, piece of furniture, desk, table, ground, etc. The arranging at least one positional display element in an irregular pattern of operation 2702 can include operation 2716, that can include, but is not limited to, allowing motion of the at least one positional display element. For example, allowing motion between multiple ones of the at least one positional display element. The arranging at least one positional display element in an irregular pattern of operation 2702 can include operation 2718, that can include, but is not limited to, maintaining the at least one positional display element in a substantially fixed position. For example, maintaining the at least one positional display element in a substantially fixed position. The order of the operations, methods, mechanisms, etc. as described with respect to FIG. 21 are intended to be illustrative in nature, and not limited in scope.

One embodiment of a high-level flowchart of a positional display element compensating technique 2800 is described with respect to FIG. 22 and includes, but is not limited to, operation 2802, as well as optional operations 2804 and/or 2806. The high-level flowchart of FIG. 22 should be considered in combination with the positional display element(s) 11, as described with respect to FIG. 16. One embodiment of operation 2802 can include, but is not limited to, compensating for an undesired or incorrect operation of a first positional display element by altering a display operation of a second positional display element. For example, compensating for the incorrect operation of the first positional display element by altering the display operation of the second positional display element, such as, e.g., controlling relative illumination, reflection, were some optical characteristic of one of the at least one positional display element(s). One embodiment of operation 2804 can include, but is not limited to, wherein the second positional display element is a neighbor of the first positional display element. For example, configuring the second positional display element to be a neighbor (not necessarily directly adjacent) of the first positional display element. One embodiment of operation 2806 can include, but is not limited to, polling the first positional display element to determine the undesired or incorrect operation of the first positional display element. For example, polling the positional display element to determine a desired operation thereof. The order of the operations, methods, mechanisms, etc. as described with respect to FIG. 22 are intended to be illustrative in nature, and not limited in scope.

One embodiment of a high-level flowchart of a positional display element compensating technique 2900 is described with respect to FIG. 23 and includes, but is not limited to, operation 2902. The high-level flowchart of FIG. 23 should be considered in combination with the positional display element(s) 11, as described with respect to FIG. 16. One embodiment of operation 2902 can include, but is not limited to, compensating for a non-uniform configuration of a plurality of positional display elements. For example, compensating for a non-uniform configuration of multiple ones of the at least one positional display element(s) 11. The order of the operations, methods, mechanisms, etc. as described with respect to FIG. 23 are intended to be illustrative in nature, and not limited in scope.

One embodiment of a high-level flowchart of a positional display element displaying technique 3000 is described with respect to FIG. 24 and includes, but is not limited to, operation 3002, as well as optional operations 3010, 3012, and/or 3014. The high-level flowchart of FIG. 24 should be considered in combination with the positional display element(s) 11, as described with respect to FIG. 16. One embodiment of operation 3002 can include, but is not limited to, providing a display at least partially including a plurality of positional display elements arranged in a non-uniform configuration. For example, arranging the plurality of the positional display elements in the non-uniform configuration, such as by having a variable spacing, dimensions, operating characteristics, etc. One embodiment of operation 3010 can include, but is not limited to, securing the plurality of positional display elements to a substrate. For example, attaching of Crowley of the positional display element(s) to a substrate, which may be flexible or rigid. One embodiment of operation 3012 can include, but is not limited to, supporting the plurality of positional display elements by a fluid curtain. For example, maintaining the plurality of the positional display elements within the fluid curtain. One embodiment of operation 3014 can include, but is not limited to, compensating for the non-uniform configuration between the plurality of positional display elements. The order of the operations, methods, mechanisms, etc. as described with respect to FIG. 24 are intended to be illustrative in nature, and not limited in scope.

One embodiment of a high-level flowchart of a suspended positional display element displaying technique 3200 is described with respect to FIG. 25 and includes, but is not limited to, operations 3202 and 3204. The high-level flowchart of FIG. 25 should be considered in combination with the positional display element(s) 11, as described with respect to FIG. 16. One embodiment of operation 3202 can include, but is not limited to, establishing a supply to support at least one suspended positional display element. For example, providing a supply to support the at least one positional display element(s). One embodiment of operation 3204 can include, but is not limited to, generating an image at least partially by controlling actuation of the at least one suspended positional display element depending at least in part on their relative positions. For example, generating the image of controlling which ones of the at least one suspended positional display element(s) are actuated depending at least in part on their relative positions. The order of the operations, methods, mechanisms, etc. as described with respect to FIG. 25 are intended to be illustrative in nature, and not limited in scope.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

VII. Conclusion

This disclosure provides a number of embodiments of the display 21 that can include the at least one positional display element(s) 11 to affect the presentation. Each positional display element(s) 11 can allow display information, such as data, to be displayed. In certain embodiments, the positional display element(s) can store, process, transfer, and perform other data-processing techniques upon the display information. For example, in certain embodiments, certain positional display element(s) can transfer the display information to another positional display element(s) 11 and/or another device. The embodiments of the positional display element(s) 11 as are described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer and/or designer of the positional display element(s) and/or the display may opt for mainly a hardware and/or firmware vehicle. In alternate embodiments, if flexibility is paramount, the implementer and/or designer may opt for mainly a software implementation. In yet other embodiments, the implementer and/or designer may opt for some combination of hardware, software, and/or firmware. Hence, there are several possible techniques by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
providing a plurality of positional display elements distributed within a suspension medium, the plurality of positional display elements being configured to emit light to display at least an image portion;
determining a position of at least one positional display element of the plurality of positional display elements;
displaying the at least the image portion with the at least one positional display element based at least in part on the determining the position of the at least one positional display element;
arranging the plurality of the positional display elements in an irregular pattern; and
compensating an irregular attribute of at least one selected positional display element with respect to at least one other positional display element at least partially by employing one or more locations of one or more other positional display elements of the plurality of positional display elements to compensate the irregular attribute.

2. The method of claim 1, further comprising:
compensating an irregular intensity of at least one positional display element with respect to at least one other positional display element, in which the irregular intensity at least partially results from the arranging the plurality of positional display elements in the irregular pattern.

3. The method of claim 1, further comprising:
compensating the irregular pattern of at least one selected positional display element with respect to at least one other positional display element at least partially by employing one or more locations of one or more other positional display elements of the plurality of positional display elements to compensate the irregular pattern.

4. The method of claim 1, further comprising:
compensating an irregular orientation of at least one selected positional display element with respect to at least one other positional display element at least partially by employing one or more locations of one or more other positional display elements of plurality of positional display elements to compensate the irregular orientation.

5. A method comprising:
providing a plurality of positional display elements distributed within a suspension medium, the plurality of positional display elements being configured to emit light to display at least an image portion and further configured to at least one of communicate or transfer data with each other;
addressing at least one positional display element of the plurality of positional display elements, the at least one positional display element being configured to derive an addressed position of the at least one positional display element; and
affecting a visual presentation at least partially using the at least one positional display element based at least in part on the addressing the at least one positional display element.

6. The method of claim 5, wherein the at least one positional display element comprises a plurality of positional display elements, the method further comprising:

allowing at least a first one of the plurality of positional display elements to be displaced with respect to at least a second one of the plurality of positional display elements, wherein the at least the first one of the plurality of positional display elements and the at least the second one of the plurality of positional display elements are utilized in the affecting the visual presentation prior to the allowing the at least the first one of the plurality of positional display elements to be displaced.

7. The method of claim 5, wherein the addressing at least one positional display element configured to derive an addressed position of the at least one positional display element is performed at least partially within the at least one positional display element.

8. The method of claim 5, wherein the addressing at least one positional display element configured to derive an addressed position of the at least one positional display element is performed at least partially in a controller device that is operationally situated externally to the at least one positional display element.

9. The method of claim 5, wherein the affecting a visual presentation at least partially using the at least one positional display element is performed at least partially within the at least one positional display element.

10. The method of claim 5, wherein the affecting a visual presentation at least partially using the at least one positional display element is performed at least partially in a controller device that is operationally situated externally to the at least one positional display element.

11. A method comprising:
arranging a plurality of positional display elements in an irregular pattern, one or more of the plurality of positional display elements being configured to communicate with one or more other positional display elements of the plurality of positional display elements;
determining a relative position of at least one of the plurality of positional display elements that have been arranged in the irregular pattern;
displaying at least a portion of an image at least partially in response to the determining the relative position of the at least one of the plurality of positional display elements that have been arranged in the irregular pattern; and
compensating an irregular attribute of at least one selected positional display element with respect to at least one other positional display element at least partially by employing one or more locations of one or more other positional display elements of the plurality of positional display elements to compensate the irregular attribute.

12. The method of claim 11, further comprising:
allowing at least a first one of the plurality of positional display elements to be displaced with respect to at least a second one of the plurality of positional display elements, wherein the at least the first one of the plurality of positional display elements and the at least the second one of the plurality of positional display elements are utilized in the displaying the at least the portion of the image after the allowing the at least the first one of the plurality of positional display elements to be displaced.

13. The method of claim 11, wherein the arranging a plurality of positional display elements in an irregular pattern comprises:
suspending the a plurality of positional display elements in a suspending media.

14. The method of claim 11, wherein the arranging a plurality of positional display elements in an irregular pattern comprises:
attaching the a plurality of positional display elements to a substrate.

15. The method of claim 11, wherein the arranging a plurality of positional display elements in an irregular pattern comprises:
allowing motion of the plurality of positional display elements.

16. The method of claim 11, wherein the arranging a plurality of positional display elements in an irregular pattern comprises:
maintaining the plurality of positional display elements in a substantially fixed position.

17. A method comprising:
determining a desired operation of a first positional display element suspended within a suspension medium, the first positional display element being configured to emit light;
determining that the first positional display element is operating at an undesired operation based at least partially on at least one of a communication or transfer of data between the first positional display element and a second positional display element suspended within the suspension medium, the second positional display element being configured to emit light, the undesired operation being other than the desired operation; and
compensating for the undesired operation of the first positional display element by altering a display operation of the second positional display element.

18. The method of claim 17, wherein the second positional display element is a neighbor of the first positional display element.

19. The method of claim 17, further comprising polling the first positional display element to determine the undesired operation of the first positional display element.

20. The method of claim 17, wherein determining that the first positional display element is operating at an undesired operation based at least partially on at least one of a communication or transfer of data between the first positional display element and a second positional display element suspended within the suspension medium, the second positional display element being configured to emit light, the undesired operation being other than the desired operation includes:
determining that the first positional display element is operating at an undesired operation, the undesired operation being at least one of an undesired illumination or an undesired reflection.

21. The method of claim 17, wherein compensating for the undesired operation of the first positional display element by altering a display operation of a second positional display element includes:
adjusting at least one of an illumination or a reflection of the second positional display element to compensate for the undesired operation of the first positional display element.

22. The method of claim 17, wherein the first and second positional display elements are free-floating positional display elements distributed within the suspension medium.

23. A system comprising:
circuitry for arranging a plurality of positional display elements in an irregular pattern, the plurality of positional display elements being moveably suspended within a suspension medium;
circuitry for determining a relative position of at least one the plurality of positional display elements that have been arranged in the irregular pattern; and
circuitry for displaying at least a portion of an image at least partially in response to the determining the relative position of the at least one the plurality of positional display elements that have been arranged in the irregular pattern.

24. A method comprising:
providing a plurality of positional display elements distributed within a suspension medium, the plurality of positional display elements being configured to emit light to display at least an image portion, the plurality of positional display elements being further configured to at least one of communicate or transfer data with each other;
determining a position of at least one positional display element of the plurality of positional display elements; and
displaying the at least the image portion with the at least one positional display element based at least in part on the determining the position of the at least one positional display element.

25. The method of claim 24, wherein the determining a position of at least one positional display element configured to display at least an image portion comprises:
determining the position of the at least one positional display element configured to display an at least a magnified image portion.

26. The method of claim 24, wherein the determining a position of at least one positional display element configured to display at least an image portion comprises:
determining the position of the at least one positional display element configured to display an at least a reduced image portion.

27. The method of claim 24, wherein the determining a position of at least one positional display element configured to display at least an image portion comprises:
determining the position of the at least one positional display element configured to display an at least a focused image portion.

28. The method of claim 24, wherein the determining a position of at least one positional display element configured to display at least an image portion comprises:
determining the position of the at least one positional display element configured to display at least an image processed image portion.

29. The method of claim 24, wherein the determining a position of at least one positional display element configured to display at least an image portion comprises:
determining the position of the at least one positional display element configured to display at least a smoothed image portion.

30. The method of claim 24, wherein the displaying the at least the image portion with the at least one positional display element based at least in part on the determining the position of the at least one positional display element comprises:
displaying the at least the image portion at least partially using a plurality of positional display elements arranged as at least one of a wand, a propeller, or at least one confetti display.

31. The method of claim 24, wherein the determining a position of at least one positional display element configured to display at least an image portion is performed at least partially at the at least one positional display element.

32. The method of claim 24, wherein the determining a position of at least one positional display element configured to display at least an image portion is performed at least partially at a device that is distinct from the at least one positional display element.

33. The method of claim 24, wherein the at least one positional display element is secured using at least one of a connector, a mesh, or a fabric.

34. The method of claim 24, wherein the at least one positional display element includes at least one of a mote display element, an LCD-based display element, or a plasma-based display element.

35. The method of claim 24, wherein the at least one positional display element comprises a plurality of positional display elements, the method further comprising:
arranging the plurality of positional display elements in a regular array.

36. The method of claim 24, wherein the at least one positional display element comprises a plurality of positional display elements, the method further comprising:
arranging the plurality of positional display elements in an irregular configuration.

37. The method of claim 24, wherein the at least one positional display element comprises a plurality of positional display elements, the method further comprising:
compensating an irregular attribute of the at least one positional display element with respect to at least one other positional display element.

38. The method of claim 24, wherein the at least one positional display element comprises a plurality of positional display elements, the method further comprising:
allowing at least a first one of the plurality of positional display elements to be displaced with respect to at least a second one of the plurality of positional display elements,
wherein the at least the first one of the plurality of positional display elements and the at least the second one of the plurality of positional display elements are utilized in the displaying the at least the image portion after the allowing the at least the first one of the plurality of positional display elements to be displaced.

39. The method of claim 24, wherein providing a plurality of positional display elements configured to display at least an image portion distributed within a suspension medium includes:
suspending a plurality of free-floating positional display elements distributed within the suspension medium using one or more levitation mechanisms.

40. The method of claim 39, wherein suspending a plurality of free-floating positional display elements distributed within the suspension medium using one or more levitation mechanisms
suspending one or more of the plurality of free-floating positional display elements distributed within the suspension medium using at least one of a fluid pump, a balloon, a propeller, a spinner, a tether, or a fluid blower.

41. The method of claim 24,
wherein displaying the at least the image portion with the at least one positional display element based at least in part on the determining the position of the at least one positional display element includes:
displaying the at least the image portion using data at least one of communicated or transferred between two or more positional display elements of the plurality of positional display elements.

42. The method of claim 24, wherein providing a plurality of positional display elements distributed within a suspension medium, the plurality of positional display elements being configured to emit light to display at least an image portion comprises:
providing a plurality of positional display elements distributed within a suspension medium, at least one of the plurality of positional display elements being a robotic positional display element, the robotic positional display element providing capability to direct and control movement of the robotic positional display element.

43. A method comprising:
- providing a plurality of robotic positional display elements, the plurality of robotic positional display elements being configured to emit light to display at least an image portion and being configured to at least one of communicate or transfer data with at least one other of the plurality of robotic positional display elements;
- determining a position of at least one robotic positional display element of the plurality of robotic positional display elements; and
- displaying the at least the image portion with the at least one robotic positional display element based at least in part on the determining the position of the at least one robotic positional display element.

44. The method of claim 43, further comprising:
- compensating an irregular characteristic of at least one selected robotic positional display element with respect to at least one other robotic positional display element at least partially by employing one or more locations of one or more other robotic positional display elements of the plurality of robotic positional display elements to compensate the irregular characteristic.

45. The method of claim 44, wherein compensating an irregular characteristic of at least one selected robotic positional display element with respect to at least one other robotic positional display element at least partially by employing one or more locations of one or more other robotic positional display elements of the plurality of robotic positional display elements to compensate the irregular characteristic comprises:
- compensating an irregular characteristic of at least one selected robotic positional display element with respect to at least one other robotic positional display element at least partially by employing one or more locations of one or more other robotic positional display elements of the plurality of robotic positional display elements to compensate the irregular characteristic, the irregular characteristic including at least one of an irregular pattern, an irregular orientation, an irregular attribute, or an irregular intensity.

* * * * *